United States Patent
Feng

(10) Patent No.: US 10,887,042 B2
(45) Date of Patent: Jan. 5, 2021

(54) DATA TRANSMISSION METHOD, DEVICE, AND SYSTEM

(71) Applicant: Huawei Technologies Co., Ltd., Shenzhen (CN)

(72) Inventor: Shulan Feng, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 50 days.

(21) Appl. No.: 16/185,975

(22) Filed: Nov. 9, 2018

(65) Prior Publication Data

US 2019/0081727 A1 Mar. 14, 2019

Related U.S. Application Data

(63) Continuation of application No. PCT/CN2016/081864, filed on May 12, 2016.

(51) Int. Cl.
*H04L 1/00* (2006.01)
*H04L 5/00* (2006.01)
*H04L 1/20* (2006.01)

(52) U.S. Cl.
CPC .............. *H04L 1/0003* (2013.01); *H04L 1/00* (2013.01); *H04L 1/0009* (2013.01); *H04L 1/0016* (2013.01); *H04L 1/0033* (2013.01); *H04L 1/203* (2013.01); *H04L 5/006* (2013.01); *H04L 5/0057* (2013.01); *H04L 1/0026* (2013.01)

(58) Field of Classification Search
None
See application file for complete search history.

(56) References Cited

U.S. PATENT DOCUMENTS

| | | |
|---|---|---|
| 2007/0141994 A1 | 6/2007 | Cheng |
| 2009/0287970 A1 | 11/2009 | Iizuka et al. |
| 2010/0014500 A1 | 1/2010 | Lee et al. |
| 2011/0164507 A1 | 7/2011 | Jeon |
| 2011/0222415 A1 | 9/2011 | Ramamurthi et al. |
| 2012/0140661 A1 | 6/2012 | Ohseki et al. |

(Continued)

FOREIGN PATENT DOCUMENTS

| | | |
|---|---|---|
| CN | 101483501 A | 7/2009 |
| CN | 101489280 A | 7/2009 |

(Continued)

OTHER PUBLICATIONS

3rd Generation Partnership Project; Technical Specification Group Radio Access Network; Evolved Universal Terrestrial Radio Access (E-UTRA); Physical layer procedures (Release 13), 3GPP TS 36.213 V13.1.1 (Mar. 2016), 358 pages.

(Continued)

*Primary Examiner* — Diane L Lo
(74) *Attorney, Agent, or Firm* — Slater Matsil, LLP

(57) ABSTRACT

A first communications device obtains a first transmission quality target and first channel quality information, determines a modulation and coding scheme (MCS) of to-be-transmitted data based on the first transmission quality target and the first channel quality information, codes and modulates the to-be-transmitted data based on the MCS of the to-be-transmitted data, and sends the MCS of the to-be-transmitted data and the coded and modulated to-be-transmitted data to a second communications device.

24 Claims, 12 Drawing Sheets

(56) References Cited

U.S. PATENT DOCUMENTS

| | | | |
|---|---|---|---|
| 2013/0021931 A1 | 1/2013 | Kim et al. | |
| 2013/0114563 A1* | 5/2013 | Oizumi | H04L 5/001 370/329 |
| 2013/0343215 A1* | 12/2013 | Li | H04B 7/024 370/252 |
| 2014/0003260 A1* | 1/2014 | Tabet | H04L 47/10 370/252 |
| 2014/0269767 A1* | 9/2014 | Djukic | H04L 1/1896 370/474 |
| 2015/0098342 A1 | 4/2015 | Tabet et al. | |
| 2016/0057647 A1 | 2/2016 | Sullivan et al. | |
| 2019/0036829 A1* | 1/2019 | Ji | H04W 24/00 |

FOREIGN PATENT DOCUMENTS

| | | |
|---|---|---|
| CN | 101682463 A | 3/2010 |
| CN | 101754289 A | 6/2010 |
| CN | 101925006 A | 12/2010 |
| CN | 102377508 A | 3/2012 |
| CN | 105553616 A | 5/2016 |
| EP | 3427422 | 9/2017 |
| JP | 2009267441 A | 11/2009 |
| JP | 2011193471 A | 9/2011 |
| JP | 2015527792 A | 9/2015 |
| RU | 2427087 C2 | 8/2011 |
| WO | 2013176873 A1 | 11/2013 |
| WO | 2014161820 A1 | 10/2014 |
| WO | 2015048361 A1 | 4/2015 |
| WO | 2016023575 A1 | 2/2016 |
| WO | 2016067077 A1 | 5/2016 |
| WO | 2017152930 A1 | 9/2017 |

OTHER PUBLICATIONS

Huawei, "Throughput evaluation with cell-specific frequency-hopped/shifted DL RS using realistic DL CQI estimation/adaptive adjustment," TSG RAN WG1 meeting No. 50, R1-073509, Aug. 20-24, 2007, 5 pages, Athens, Greece.

* cited by examiner

DATA TRANSMISSION METHOD, DEVICE, AND SYSTEM

CROSS-REFERENCE TO RELATED APPLICATIONS

This application is a continuation of International Application No. PCT/CN2016/081864, filed on May 12, 2016, the disclosure of which is hereby incorporated by reference in its entirety.

TECHNICAL FIELD

The present invention relates to the field of communications technologies, and in particular, to a data transmission method, a device, and a system.

BACKGROUND

In a radio communications system such as a Long Term Evolution (LTE) system or a 3rd Generation Partnership Project (3GPP) system, during data transmission between two communications device, a modulation and coding scheme (MCS) needs to be determined based on a preset transmission quality target, and data is coded and modulated based on the determined modulation and coding scheme and then is transmitted.

In a current system, for a service requiring relatively high reliability, the transmission quality target can be ensured only through a plurality of retransmissions. However, the plurality of retransmissions may cause an increase in a transmission delay, and as a result, a requirement of a service that requires both an extremely low delay and relatively high reliability cannot be met. In addition, improving the transmission quality target may reduce system transmission efficiency.

Consequently, in the current system, the transmission quality target cannot meet the requirement of the low-delay and high-reliability service and a system efficiency requirement at the same time.

SUMMARY

To resolve a current-system problem that a transmission quality target cannot meet a requirement of a low-delay and high-reliability service and a system efficiency requirement at the same time, embodiments of the present invention provides a data transmission method, a device, and a system. The technical solutions are as follows.

According to a first aspect, embodiments of the present invention provide a data transmission method. The method includes obtaining, by a first communications device, a first transmission quality target. The method also includes obtaining, by the first communications device, first channel quality information, where the first channel quality information is used to indicate quality of a channel between the first communications device and a second communications device, and the first channel quality information is obtained based on the first transmission quality target. The method also includes determining, by the first communications device, a modulation and coding scheme (MCS) of to-be-transmitted data based on the first transmission quality target and the first channel quality information, and coding and modulating the to-be-transmitted data based on the MCS of the to-be-transmitted data. The method also includes sending, by the first communications device, the MCS of the to-be-transmitted data and the coded and modulated to-be-transmitted data to the second communications device.

In a possible implementation, the obtaining, by a first communications device, a first transmission quality target includes: determining, by the first communications device, the first transmission quality target from a plurality of transmission quality targets based on a delay requirement and a reliability requirement of the to-be-transmitted data. For example, a lower delay requirement of the to-be-transmitted data indicates a higher first transmission quality target, and a higher reliability requirement of the to-be-transmitted data indicates a higher first transmission quality target. Further, the method includes: sending, by the first communications device, the first transmission quality target to the second communications device; and the obtaining, by the first communications device, first channel quality information includes: receiving, by the first communications device, the first channel quality information sent by the second communications device.

In a possible implementation, the obtaining, by the first communications device, first channel quality information includes: receiving, by the first communications device, second channel quality information sent by the second communications device, where the second channel quality information is the quality that is of the channel between the first communications device and the second communications device and that is measured by the second communications device based on a second transmission quality target; and when the first communications device determines that the second transmission quality target is the same as the first transmission quality target, using the second channel quality information as the first channel quality information; and when the first communications device determines that the second transmission quality target is different from the first transmission quality target, obtaining the first channel quality information based on the second channel quality information.

The second transmission quality target is a transmission quality target pre-stored by the first communications device and the second communications device. The second transmission quality target may be a transmission quality target agreed upon by the first communications device and the second communications device.

In a possible implementation, the obtaining, by a first communications device, a first transmission quality target includes: receiving, by the first communications device, the first transmission quality target sent by the second communications device.

In a possible implementation, the obtaining, by the first communications device, first channel quality information includes: measuring, by the first communications device, channel quality of a sounding signal sent by the second communications device, and generating the first channel quality information.

In a possible implementation, the obtaining, by the first communications device, first channel quality information includes: receiving, by the first communications device, the first channel quality information sent by the second communications device.

In a possible implementation, the determining, by the first communications device, an MCS of to-be-transmitted data based on the first transmission quality target and the first channel quality information includes: determining, by the first communications device, the MCS of the to-be-transmitted data according to a preset mapping relationship or a preset mapping list and based on the first transmission quality target and the first channel quality information.

In a possible implementation, the transmission quality target includes at least one of a target block error rate (BLER), a target signal-to-noise ratio (SNR), a service type, and a parameter related to a transmission target. For example, the target BLER is 0.1 or 0.00001, the target signal-to-noise ratio (SNR) is 3 dB or 6 dB, or a service is a low-delay and high-reliability service or a common service. With regard to the parameter related to the transmission target, for example, a number of hybrid automatic repeat requests (HARQ), the number of HARQs is zero or eight. If the number of HARQs is zero, a corresponding service is a low-delay and high-reliability service. If the number of HARQs is eight, a corresponding service is a common service.

In a possible implementation, the first channel quality information includes at least one of a channel quality indicator CQI, a precoding matrix indicator PMI, and a rank indication RI.

According to a second aspect, embodiments of the present invention provide a data transmission method. The method includes receiving, by a second communications device, a modulation and coding scheme (MCS) that is of to-be-transmitted data and that is sent by a first communications device, where the MCS of the to-be-transmitted data is determined by the first communications device based on a first transmission quality target and first channel quality information. The method also includes receiving, by the second communications device, the to-be-transmitted data sent by the first communications device, and demodulating and decoding the to-be-transmitted data based on the MCS of the to-be-transmitted data.

In a possible implementation, before the receiving, by a second communications device, a modulation and coding scheme (MCS) that is of to-be-transmitted data and that is sent by a first communications device, the method further includes: obtaining, by the second communications device, the first transmission quality target, and generating the first channel quality information based on the first transmission quality target; and sending, by the second communications device, the first channel quality information to the first communications device.

Further, the obtaining, by the second communications device, the first transmission quality target includes: determining, by the second communications device, the first transmission quality target from a plurality of transmission quality targets based on a delay requirement and a reliability requirement of the to-be-transmitted data. Further, the method includes: sending, by the second communications device, the first transmission quality target to the first communications device.

Alternatively, the obtaining, by the second communications device, the first transmission quality target includes: receiving, by the second communications device, the first transmission quality target sent by the first communications device.

In a possible implementation, before the receiving, by a second communications device, a modulation and coding scheme (MCS) that is of to-be-transmitted data and that is sent by a first communications device, the method further includes: determining, by the second communications device, the first transmission quality target from a plurality of transmission quality targets based on a delay requirement and a reliability requirement of the to-be-transmitted data; and sending, by the second communications device, the first transmission quality target to the first communications device.

In a possible implementation, before the receiving, by a second communications device, a modulation and coding scheme (MCS) that is of to-be-transmitted data and that is sent by a first communications device, the method further includes: measuring, by the second communications device, a channel based on a second transmission quality target, and generating second channel quality information; and sending, by the second communications device, the second channel quality information to the first communications device.

The second transmission quality target is a transmission quality target pre-stored by the first communications device and the second communications device. The second transmission quality target may be a transmission quality target agreed upon by the first communications device and the second communications device.

In a possible implementation, the MCS of the to-be-transmitted data is determined by the first communications device according to a preset mapping relationship or a preset mapping list and based on the first transmission quality target and the first channel quality information.

In a possible implementation, the transmission quality target includes at least one of a target block error rate (BLER), a target signal-to-noise ratio (SNR), a service type, and a parameter related to a transmission target. For example, the target BLER is 0.1 or 0.00001, the target signal-to-noise ratio (SNR) is 3 dB or 6 dB, or a service is a low-delay and high-reliability service or a common service. With regard to the parameter related to the transmission target, for example, a number of HARQs, the number of HARQs is zero or eight. If the number of HARQs is zero, a corresponding service is a low-delay and high-reliability service. If the number of HARQs is eight, a corresponding service is a common service.

In a possible implementation, the first channel quality information includes at least one of a channel quality indicator (CQI), a precoding matrix indicator (PMI), and a rank indication (RI).

According to a third aspect, embodiments of the present invention provide a data transmission method, which is a method for sending data by the second communications device to the first communications device, and is corresponding to the data transmission method described in the first aspect or any possible implementation of the first aspect. The method includes obtaining, by a first communications device, a first transmission quality target. The method also includes obtaining, by the first communications device, first channel quality information, where the first channel quality information is used to indicate quality of a channel between the first communications device and a second communications device, and the first channel quality information is obtained based on the first transmission quality target. The method also includes determining, by the first communications device, a modulation and coding scheme (MCS) of to-be-transmitted data based on the first transmission quality target and the first channel quality information. The method also includes sending, by the first communications device, the MCS of the to-be-transmitted data to the second communications device. The method also includes receiving, by the first communications device, the to-be-transmitted data coded and modulated by the second communications device based on the MCS of the to-be-transmitted data.

In a possible implementation, the obtaining, by a first communications device, a first transmission quality target includes: determining, by the first communications device, the first transmission quality target from a plurality of transmission quality targets based on a delay requirement and a reliability requirement of the to-be-transmitted data. For example, a lower delay requirement of the to-be-transmitted data indicates a higher first transmission quality target, and a higher reliability requirement of the to-be-transmitted data indicates a higher first transmission quality target. Further, the method includes: sending, by the first communications device, the first transmission quality target to the second communications device; and the obtaining, by the first communications device, first channel quality information includes: receiving, by the first communications device, the first channel quality information sent by the second communications device.

In a possible implementation, the obtaining, by the first communications device, first channel quality information includes: receiving, by the first communications device, second channel quality information sent by the second communications device, where the second channel quality information is the quality that is of the channel between the first communications device and the second communications device and that is measured by the second communications device based on a second transmission quality target; when the first communications device determines that the second transmission quality target is the same as the first transmission quality target, using the second channel quality information as the first channel quality information; and when the first communications device determines that the second transmission quality target is different from the first transmission quality target, obtaining the first channel quality information based on the second channel quality information.

The second transmission quality target is a transmission quality target pre-stored by the first communications device and the second communications device. The second transmission quality target may be a transmission quality target agreed upon by the first communications device and the second communications device.

In a possible implementation, the obtaining, by a first communications device, a first transmission quality target includes: receiving, by the first communications device, the first transmission quality target sent by the second communications device.

In a possible implementation, the obtaining, by the first communications device, first channel quality information includes: measuring, by the first communications device, channel quality of a sounding signal sent by the second communications device, and generating the first channel quality information.

In a possible implementation, the obtaining, by the first communications device, first channel quality information includes: receiving, by the first communications device, the first channel quality information sent by the second communications device.

In a possible implementation, the determining, by the first communications device, an MCS of to-be-transmitted data based on the first transmission quality target and the first channel quality information includes: determining, by the first communications device, the MCS of the to-be-transmitted data according to a preset mapping relationship or a preset mapping list and based on the first transmission quality target and the first channel quality information.

In a possible implementation, the transmission quality target includes at least one of a target block error rate (BLER), a target signal-to-noise ratio (SNR), a service type, and a parameter related to a transmission target. For example, the target BLER is 0.1 or 0.00001, the target signal-to-noise ratio (SNR) is 3 dB or 6 dB, or a service is a low-delay and high-reliability service or a common service. With regard to the parameter related to the transmission target, for example, a number of HARQs, the number of HARQs is zero or eight. If the number of HARQs is zero, a corresponding service is a low-delay and high-reliability service. If the number of HARQs is eight, a corresponding service is a common service.

In a possible implementation, the first channel quality information includes at least one of a channel quality indicator (CQI), a precoding matrix indicator (PMI), and a rank indication (RI).

According to a fourth aspect, embodiments of the present invention provide a data transmission method, which is a method for sending data by the second communications device to the first communications device, and is corresponding to the data transmission method described in the second aspect or any possible implementation of the second aspect. The method includes receiving, by a second communications device, a modulation and coding scheme (MCS) that is of to-be-transmitted data and that is sent by a first communications device, where the MCS of the to-be-transmitted data is determined by the first communications device based on a first transmission quality target and first channel quality information. The method also includes coding and modulating, by the second communications device, the to-be-transmitted data based on the MCS of the to-be-transmitted data, and sending the coded and modulated to-be-transmitted data to the first communications device.

In a possible implementation, before the receiving, by a second communications device, a modulation and coding scheme (MCS) that is of to-be-transmitted data and that is sent by a first communications device, the method further includes: obtaining, by the second communications device, the first transmission quality target, and generating the first channel quality information based on the first transmission quality target; and sending, by the second communications device, the first channel quality information to the first communications device.

Further, the obtaining, by the second communications device, the first transmission quality target includes: determining, by the second communications device, the first transmission quality target from a plurality of transmission quality targets based on a delay requirement and a reliability requirement of the to-be-transmitted data. Further, the method includes: sending, by the second communications device, the first transmission quality target to the first communications device.

Alternatively, the obtaining, by the second communications device, the first transmission quality target includes: receiving, by the second communications device, the first transmission quality target sent by the first communications device.

In a possible implementation, before the receiving, by a second communications device, a modulation and coding scheme (MCS) that is of to-be-transmitted data and that is sent by a first communications device, the method further includes: determining, by the second communications device, the first transmission quality target from a plurality of transmission quality targets based on a delay requirement and a reliability requirement of the to-be-transmitted data; and sending, by the second communications device, the first transmission quality target to the first communications device.

In a possible implementation, before the receiving, by a second communications device, a modulation and coding scheme (MCS) that is of to-be-transmitted data and that is sent by a first communications device, the method further includes: measuring, by the second communications device, a channel based on a second transmission quality target, and generating second channel quality information; and sending, by the second communications device, the second channel quality information to the first communications device.

The second transmission quality target is a transmission quality target pre-stored by the first communications device and the second communications device. The second transmission quality target may be a transmission quality target agreed upon by the first communications device and the second communications device.

In a possible implementation, the MCS of the to-be-transmitted data is determined by the first communications device according to a preset mapping relationship or a preset mapping list and based on the first transmission quality target and the first channel quality information.

In a possible implementation, the transmission quality target includes at least one of a target block error rate (BLER), a target signal-to-noise ratio (SNR), a service type, and a parameter related to a transmission target. For example, the target BLER is 0.1 or 0.00001, the target signal-to-noise ratio (SNR) is 3 dB or 6 dB, or a service is a low-delay and high-reliability service or a common service. With regard to the parameter related to the transmission target, for example, a number of HARQs, the number of HARQs is zero or eight. If the number of HARQs is zero, a corresponding service is a low-delay and high-reliability service. If the number of HARQs is eight, a corresponding service is a common service.

In a possible implementation, the first channel quality information includes at least one of a channel quality indicator (CQI), a precoding matrix indicator (PMI), and a rank indication (RI).

According to a fifth aspect, embodiments of the present invention provides a first communications device, where the first communications device includes a processing unit and a sending unit. The processing unit is configured to obtain a first transmission quality target and first channel quality information, where the first channel quality information is used to indicate quality of a channel between the first communications device and a second communications device, and the first channel quality information is obtained based on the first transmission quality target. The processing unit is further configured to: determine a modulation and coding scheme (MCS) of to-be-transmitted data based on the first transmission quality target and the first channel quality information, and code and modulate the to-be-transmitted data based on the MCS of the to-be-transmitted data. The sending unit is configured to send, to the second communications device, the MCS of the to-be-transmitted data and the to-be-transmitted data coded and modulated by the processing unit.

In a possible implementation, the processing unit is further configured to determine the first transmission quality target from a plurality of transmission quality targets based on a delay requirement and a reliability requirement of the to-be-transmitted data. Further, the first communications device includes a receiving unit; the sending unit is further configured to send the first transmission quality target to the second communications device; and the processing unit is further configured to receive, by using the receiving unit, the first channel quality information sent by the second communications device.

In a possible implementation, the first communications device further includes a receiving unit, configured to receive second channel quality information sent by the second communications device, where the second channel quality information is the quality that is of the channel between the first communications device and the second communications device and that is measured by the second communications device based on a second transmission quality target. The processing unit is further configured to obtain the first channel quality information based on the second channel quality information.

In a possible implementation, the first communications device further includes a receiving unit; and the processing unit is further configured to receive, by using the receiving unit, the first transmission quality target sent by the second communications device.

In a possible implementation, the processing unit is further configured to: measure channel quality of a sounding signal sent by the second communications device, and generate the first channel quality information.

In a possible implementation, the first communications device further includes a receiving unit; and the processing unit is further configured to receive, by using the receiving unit, the first channel quality information sent by the second communications device.

In a possible implementation, the processing unit is further configured to determine the MCS of the to-be-transmitted data according to a preset mapping relationship or a preset mapping list and based on the first transmission quality target and the first channel quality information.

In a possible implementation, the transmission quality target includes at least one of a target block error rate (BLER), a target signal-to-noise ratio (SNR), a service type, and a parameter related to a transmission target. For example, the target BLER is 0.1 or 0.00001, the target signal-to-noise ratio (SNR) is 3 dB or 6 dB, or a service is a low-delay and high-reliability service or a common service. With regard to the parameter related to the transmission target, for example, a number of HARQs, the number of HARQs is zero or eight. If the number of HARQs is zero, a corresponding service is a low-delay and high-reliability service. If the number of HARQs is eight, a corresponding service is a common service.

In a possible implementation, the first channel quality information includes at least one of a channel quality indicator (CQI), a precoding matrix indicator (PMI), and a rank indication (RI).

According to a sixth aspect, embodiments of the present invention provide a second communications device, where the second communications device includes a processing unit and a receiving unit. The receiving unit is configured to receive a modulation and coding scheme (MCS) that is of to-be-transmitted data and that is sent by a first communications device, where the MCS of the to-be-transmitted data is determined by the first communications device based on a first transmission quality target and first channel quality information. The receiving unit is further configured to receive the to-be-transmitted data sent by the first communications device; and the processing unit is configured to demodulate and decode the to-be-transmitted data based on the MCS of the to-be-transmitted data.

In a possible implementation, the processing unit is further configured to: obtain the first transmission quality target, and generate the first channel quality information based on the first transmission quality target; and the second communications device further comprises a sending unit, configured to send the first channel quality information to the first communications device.

Further, the processing unit is configured to determine the first transmission quality target from a plurality of transmission quality targets based on a delay requirement and a reliability requirement of the to-be-transmitted data. Further, the sending unit is configured to send the first transmission quality target to the first communications device.

Alternatively, the processing unit is further configured to receive, by using the receiving unit, the first transmission quality target sent by the first communications device.

In a possible implementation, the processing unit is further configured to determine the first transmission quality target from a plurality of transmission quality targets based on a delay requirement and a reliability requirement of the to-be-transmitted data; and the second communications device further comprises a sending unit, configured to send the first transmission quality target to the first communications device.

In a possible implementation, the processing unit is further configured to: measure a channel based on a second transmission quality target, and generate second channel quality information; and the second communications device further comprises a sending unit, configured to send the second channel quality information to the first communications device.

In a possible implementation, the MCS of the to-be-transmitted data is determined by the first communications device according to a preset mapping relationship or a preset mapping list and based on the first transmission quality target and the first channel quality information.

In a possible implementation, the transmission quality target includes at least one of a target block error rate (BLER), a target signal-to-noise ratio (SNR), a service type, and a parameter related to a transmission target. For example, the target BLER is 0.1 or 0.00001, the target signal-to-noise ratio (SNR) is 3 dB or 6 dB, or a service is a low-delay and high-reliability service or a common service. With regard to the parameter related to the transmission target, for example, a number of HARQs, the number of HARQs is zero or eight. If the number of HARQs is zero, a corresponding service is a low-delay and high-reliability service. If the number of HARQs is eight, a corresponding service is a common service.

In a possible implementation, the first channel quality information includes at least one of a channel quality indicator (CQI), a precoding matrix indicator (PMI), and a rank indication (RI).

According to a seventh aspect, embodiments of the present invention provide a first communications device, including a processing unit, a sending unit, and a receiving unit. The processing unit is configured to obtain a first transmission quality target and first channel quality information, where the first channel quality information is used to indicate quality of a channel between the first communications device and a second communications device, and the first channel quality information is obtained based on the first transmission quality target. The processing unit is further configured to determine a modulation and coding scheme (MCS) of to-be-transmitted data based on the first transmission quality target and the first channel quality information. The sending unit is configured to send the MCS of the to-be-transmitted data to the second communications device. The receiving unit is configured to receive the to-be-transmitted data coded and modulated by the second communications device based on the MCS of the to-be-transmitted data.

In a possible implementation, the processing unit is further configured to determine the first transmission quality target from a plurality of transmission quality targets based on a delay requirement and a reliability requirement of the to-be-transmitted data. Further, the sending unit is further configured to send the first transmission quality target to the second communications device; and the processing unit is further configured to receive, by using the receiving unit, the first channel quality information sent by the second communications device.

In a possible implementation, the receiving unit is configured to receive second channel quality information sent by the second communications device, where the second channel quality information is the quality that is of the channel between the first communications device and the second communications device and that is measured by the second communications device based on a second transmission quality target; and the processing unit is further configured to obtain the first channel quality information based on the second channel quality information.

In a possible implementation, the processing unit is further configured to receive, by using the receiving unit, the first transmission quality target sent by the second communications device.

In a possible implementation, the processing unit is further configured to: measure channel quality of a sounding signal sent by the second communications device, and generate the first channel quality information.

In a possible implementation, the processing unit is further configured to receive, by using the receiving unit, the first channel quality information sent by the second communications device.

In a possible implementation, the processing unit is further configured to determine the MCS of the to-be-transmitted data according to a preset mapping relationship or a preset mapping list and based on the first transmission quality target and the first channel quality information.

In a possible implementation, the transmission quality target includes at least one of a target block error rate (BLER), a target signal-to-noise ratio (SNR), a service type, and a parameter related to a transmission target. For example, the target BLER is 0.1 or 0.00001, the target signal-to-noise ratio (SNR) is 3 dB or 6 dB, or a service is a low-delay and high-reliability service or a common service. With regard to the parameter related to the transmission target, for example, a number of HARQs, the number of HARQs is zero or eight. If the number of HARQs is zero, a corresponding service is a low-delay and high-reliability service. If the number of HARQs is eight, a corresponding service is a common service.

In a possible implementation, the first channel quality information includes at least one of a channel quality indicator (CQI), a precoding matrix indicator (PMI), and a rank indication (RI).

According to an eighth aspect, embodiments of the present invention provide a second communications device, including a processing unit, a sending unit, and a receiving unit. The receiving unit is configured to receive a modulation and coding scheme (MCS) that is of to-be-transmitted data and that is sent by a first communications device, where the MCS of the to-be-transmitted data is determined by the first communications device based on a first transmission quality target and first channel quality information. The processing unit is configured to code and modulate the to-be-transmitted data based on the MCS of the to-be-transmitted data. The sending unit is configured to send the coded and modulated to-be-transmitted data to the first communications device.

In a possible implementation, the processing unit is further configured to: obtain the first transmission quality target, and generate the first channel quality information based on the first transmission quality target; and the sending unit is further configured to send the first channel quality information to the first communications device.

Further, the processing unit is configured to determine the first transmission quality target from a plurality of transmission quality targets based on a delay requirement and a reliability requirement of the to-be-transmitted data. Further, the sending unit is configured to send the first transmission quality target to the first communications device.

Alternatively, the processing unit is further configured to receive, by using the receiving unit, the first transmission quality target sent by the first communications device.

In a possible implementation, the processing unit is further configured to determine the first transmission quality target from a plurality of transmission quality targets based on a delay requirement and a reliability requirement of the to-be-transmitted data; and the sending unit is further configured to send the first transmission quality target to the first communications device.

In a possible implementation, the processing unit is further configured to: measure a channel based on a second transmission quality target, and generate second channel quality information; and the sending unit is further configured to send the second channel quality information to the first communications device.

In a possible implementation, the MCS of the to-be-transmitted data is determined by the first communications device according to a preset mapping relationship or a preset mapping list and based on the first transmission quality target and the first channel quality information.

In a possible implementation, the transmission quality target includes at least one of a target block error rate (BLER), a target signal-to-noise ratio (SNR), a service type, and a parameter related to a transmission target. For example, the target BLER is 0.1 or 0.00001, the target signal-to-noise ratio (SNR) is 3 dB or 6 dB, or a service is a low-delay and high-reliability service or a common service. With regard to the parameter related to the transmission target, for example, a number of HARQs, the number of HARQs is zero or eight. If the number of HARQs is zero, a corresponding service is a low-delay and high-reliability service. If the number of HARQs is eight, a corresponding service is a common service.

In a possible implementation, the first channel quality information includes at least one of a channel quality indicator (CQI), a precoding matrix indicator (PMI), and a rank indication (RI).

According to a ninth aspect, embodiments of the present invention provide a first communications device, including a processor, a memory, a transmitter, and a receiver, where the processor, the memory, the transmitter, and the receiver are connected to each other. The processor is configured to obtain a first transmission quality target and first channel quality information, where the first channel quality information is used to indicate quality of a channel between the first communications device and a second communications device, and the first channel quality information is obtained based on the first transmission quality target. The processor is further configured to: determine a modulation and coding scheme (MCS) of to-be-transmitted data based on the first transmission quality target and the first channel quality information, and code and modulate the to-be-transmitted data based on the MCS of the to-be-transmitted data. The processor is further configured to send, by using the transmitter, the MCS of the to-be-transmitted data and the coded and modulated to-be-transmitted data to the second communications device.

In a possible implementation, the processor is further configured to determine the first transmission quality target from a plurality of transmission quality targets based on a delay requirement and a reliability requirement of the to-be-transmitted data.

Further, the processor is configured to send the first transmission quality target to the second communications device by using the transmitter, and the processor is further configured to receive, by using the receiver, the first channel quality information sent by the second communications device.

In a possible implementation, the processor is further configured to receive, by using the receiver, second channel quality information sent by the second communications device, where the second channel quality information is the quality that is of the channel between the first communications device and the second communications device and that is measured by the second communications device based on a second transmission quality target; and the processor is further configured to obtain the first channel quality information based on the second channel quality information.

In a possible implementation, the processor is further configured to receive, by using the receiver, the first transmission quality target sent by the second communications device.

In a possible implementation, the processor is further configured to: measure channel quality of a sounding signal sent by the second communications device, and generate the first channel quality information.

In a possible implementation, the processor is further configured to receive, by using the receiver, the first channel quality information sent by the second communications device.

In a possible implementation, the processor is further configured to determine the MCS of the to-be-transmitted data according to a preset mapping relationship or a preset mapping list and based on the first transmission quality target and the first channel quality information.

In a possible implementation, the transmission quality target includes at least one of a target block error rate (BLER), a target signal-to-noise ratio (SNR,) a service type, and a parameter related to a transmission target. For example, the target BLER is 0.1 or 0.00001, the target signal-to-noise ratio (SNR) is 3 dB or 6 dB, or a service is a low-delay and high-reliability service or a common service. With regard to the parameter related to the transmission target, for example, a number of HARQs, the number of HARQs is zero or eight. If the number of HARQs is zero, a corresponding service is a low-delay and high-reliability service. If the number of HARQs is eight, a corresponding service is a common service.

In a possible implementation, the first channel quality information includes at least one of a channel quality indicator (CQI), a precoding matrix indicator (PMI), and a rank indication (RI).

According to a tenth aspect, embodiments of the present invention provide a second communications device, including a processor, a memory, a transmitter, and a receiver, where the processor, the memory, the transmitter, and the receiver are connected to each other. The processor is configured to receive, by using the receiver, a modulation and coding scheme (MCS) that is of to-be-transmitted data and that is sent by a first communications device, where the MCS of the to-be-transmitted data is determined by the first communications device based on a first transmission quality target and first channel quality information. The processor is further configured to: receive, by using the receiver, the to-be-transmitted data sent by the first communications device, and demodulate and decode the to-be-transmitted data based on the MCS of the to-be-transmitted data.

In a possible implementation, the processor is further configured to: obtain the first transmission quality target, and generate the first channel quality information based on the first transmission quality target; and the processor is further configured to send the first channel quality information to the first communications device by using the transmitter.

Further, in a possible implementation, the processor is further configured to determine the first transmission quality target from a plurality of transmission quality targets based on a delay requirement and a reliability requirement of the to-be-transmitted data. Further, the processor is configured to send the first transmission quality target to the first communications device by using the transmitter.

Alternatively, the processor is further configured to receive, by using the receiver, the first transmission quality target sent by the first communications device.

In a possible implementation, the processor is further configured to: determine the first transmission quality target from a plurality of transmission quality targets based on a delay requirement and a reliability requirement of the to-be-transmitted data, and send the first transmission quality target to the first communications device by using the transmitter.

In a possible implementation, the processor is further configured to: measure a channel based on a second transmission quality target, and generate second channel quality information; and the processor is further configured to send the second channel quality information to the first communications device by using the transmitter.

In a possible implementation, the MCS of the to-be-transmitted data is determined by the first communications device according to a preset mapping relationship or a preset mapping list and based on the first transmission quality target and the first channel quality information.

In a possible implementation, the transmission quality target includes at least one of a target block error rate (BLER), a target signal-to-noise ratio (SNR), a service type, and a parameter related to a transmission target. For example, the target BLER is 0.1 or 0.00001, the target signal-to-noise ratio (SNR) is 3 dB or 6 dB, or a service is a low-delay and high-reliability service or a common service. With regard to the parameter related to the transmission target, for example, a number of HARQs, the number of HARQs is zero or eight. If the number of HARQs is zero, a corresponding service is a low-delay and high-reliability service. If the number of HARQs is eight, a corresponding service is a common service.

In a possible implementation, the first channel quality information includes at least one of a channel quality indicator (CQI), a precoding matrix indicator (PMI), and a rank indication (RI).

According to an eleventh aspect, embodiments of the present invention provide a first communications device, including a processor, a memory, a transmitter, and a receiver, where the processor, the memory, the transmitter, and the receiver are connected to each other. The processor is configured to obtain a first transmission quality target and first channel quality information, where the first channel quality information is used to indicate quality of a channel between the first communications device and a second communications device, and the first channel quality information is obtained based on the first transmission quality target. The processor is further configured to determine a modulation and coding scheme (MCS) of to-be-transmitted data based on the first transmission quality target and the first channel quality information. The processor is further configured to send the MCS of the to-be-transmitted data to the second communications device by using the transmitter. The processor is further configured to receive, by using the receiver, the to-be-transmitted data coded and modulated by the second communications device based on the MCS of the to-be-transmitted data.

In a possible implementation, the processor is further configured to determine the first transmission quality target from a plurality of transmission quality targets based on a delay requirement and a reliability requirement of the to-be-transmitted data.

Further, the processor is configured to send the first transmission quality target to the second communications device by using the transmitter, and the processor is further configured to receive, by using the receiver, the first channel quality information sent by the second communications device.

In a possible implementation, the processor is further configured to receive, by using the receiver, second channel quality information sent by the second communications device, where the second channel quality information is the quality that is of the channel between the first communications device and the second communications device and that is measured by the second communications device based on a second transmission quality target. The processor is further configured to obtain the first channel quality information based on the second channel quality information.

In a possible implementation, the processor is further configured to receive, by using the receiver, the first transmission quality target sent by the second communications device.

In a possible implementation, the processor is further configured to: measure channel quality of a sounding signal sent by the second communications device, and generate the first channel quality information.

In a possible implementation, the processor is further configured to receive, by using the receiver, the first channel quality information sent by the second communications device.

In a possible implementation, the processor is further configured to determine the MCS of the to-be-transmitted data according to a preset mapping relationship or a preset mapping list and based on the first transmission quality target and the first channel quality information.

In a possible implementation, the transmission quality target includes at least one of a target block error rate (BLER), a target signal-to-noise ratio (SNR), a service type, and a parameter related to a transmission target. For example, the target BLER is 0.1 or 0.00001, the target signal-to-noise ratio (SNR) is 3 dB or 6 dB, or a service is a low-delay and high-reliability service or a common service. With regard to the parameter related to the transmission target, for example, a number of HARQs, the number of HARQs is zero or eight. If the number of HARQs is zero, a corresponding service is a low-delay and high-reliability service. If the number of HARQs is eight, a corresponding service is a common service.

In a possible implementation, the first channel quality information includes at least one of a channel quality indicator (CQI), a precoding matrix indicator (PMI), and a rank indication (RI).

According to a twelfth aspect, embodiments of the present invention provide a second communications device, including a processor, a memory, a transmitter, and a receiver, where the processor, the memory, the transmitter, and the receiver are connected to each other. The processor is configured to receive, by using the receiver, a modulation and coding scheme (MCS) that is of to-be-transmitted data and that is sent by a first communications device, where the MCS of the to-be-transmitted data is determined by the first communications device based on a first transmission quality target and first channel quality information. The processor is further configured to: code and modulate the to-be-transmitted data based on the MCS of the to-be-transmitted data, and send the coded and modulated to-be-transmitted data to the first communications device by using the transmitter.

In a possible implementation, the processor is further configured to: obtain the first transmission quality target, and generate the first channel quality information based on the first transmission quality target; and the processor is further configured to send the first channel quality information to the first communications device by using the transmitter.

Further, in a possible implementation, the processor is configured to determine the first transmission quality target from a plurality of transmission quality targets based on a delay requirement and a reliability requirement of the to-be-transmitted data. Further, the processor is configured to send the first transmission quality target to the first communications device by using the transmitter.

Alternatively, the processor is further configured to receive, by using the receiver, the first transmission quality target sent by the first communications device.

In a possible implementation, the processor is further configured to: determine the first transmission quality target from a plurality of transmission quality targets based on a delay requirement and a reliability requirement of the to-be-transmitted data, and send the first transmission quality target to the first communications device by using the transmitter.

In a possible implementation, the processor is further configured to: measure a channel based on a second transmission quality target, and generate second channel quality information; and the processor is further configured to send the second channel quality information to the first communications device by using the transmitter.

In a possible implementation, the MCS of the to-be-transmitted data is determined by the first communications device according to a preset mapping relationship or a preset mapping list and based on the first transmission quality target and the first channel quality information.

In a possible implementation, the transmission quality target includes at least one of a target block error rate (BLER), a target signal-to-noise ratio (SNR), a service type, and a parameter related to a transmission target. For example, the target BLER is 0.1 or 0.00001, the target signal-to-noise ratio (SNR) is 3 dB or 6 dB, or a service is a low-delay and high-reliability service or a common service. With regard to the parameter related to the transmission target, for example, a number of HARQs, the number of HARQs is zero or eight. If the number of HARQs is zero, a corresponding service is a low-delay and high-reliability service. If the number of HARQs is eight, a corresponding service is a common service.

In a possible implementation, the first channel quality information includes at least one of a channel quality indicator (CQI), a precoding matrix indicator (PMI), and a rank indication (RI).

According to a thirteenth aspect, embodiments of the present invention provide a radio communications system, including a first communications device and a second communications device. The first communications device is the first communications device described in the fifth aspect or any possible implementation of the fifth aspect, and the second communications device is the second communications device described in the sixth aspect or any possible implementation of the sixth aspect.

According to a fourteenth aspect, embodiments of the present invention provide a radio communications system, including a first communications device and a second communications device. The first communications device is the first communications device described in the seventh aspect or any possible implementation of the seventh aspect, and the second communications device is the second communications device described in the eighth aspect or any possible implementation of the eighth aspect.

According to a fifteenth aspect, embodiments of the present invention provide a radio communications system, including a first communications device and a second communications device. The first communications device is the first communications device described in the ninth aspect or any possible implementation of the ninth aspect, and the second communications device is the second communications device described in the tenth aspect or any possible implementation of the tenth aspect.

According to a sixteenth aspect, embodiments of the present invention provide a radio communications system, including a first communications device and a second communications device. The first communications device is the first communications device described in the eleventh aspect or any possible implementation of the eleventh aspect, and the second communications device is the second communications device described in the twelfth aspect or any possible implementation of the twelfth aspect.

According to the data transmission method, the device, and the system that are provided in the embodiments of the present invention, the first communications device obtains the first transmission quality target and the first channel quality information; determines the modulation and coding scheme (MCS) of the to-be-transmitted data based on the first transmission quality target and the first channel quality information; sends the MCS of the to-be-transmitted data to the second communications device; and codes and modulates the to-be-transmitted data based on the MCS of the to-be-transmitted data and sends the coded and modulated to-be-transmitted data to the second communications device, or receives the to-be-transmitted data coded and modulated by the second communications device based on the MCS of the to-be-transmitted data. Because the MCS of the to-be-transmitted data is determined based on the first transmission quality target and the first channel quality information, an MCS is determined, for data transmitted each time, based on a transmission quality target and first channel quality information of the data transmitted each time, resolving the current-system problem that the transmission quality target cannot meet the requirement of the low-delay and high-reliability service and the system efficiency requirement at the same time.

It should be understood that the foregoing general description and the following detailed description are merely illustrative and explanatory, and are not intended to limit the present invention.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

The foregoing accompanying drawings show specific embodiments of the present invention, and more detailed descriptions are provided in the following. The accompanying drawings and text descriptions are not intended to limit the scope of the idea of the present invention in any manner, but are intended to describe the concept of the present invention to a person skilled in the art with reference to particular embodiments.

DETAILED DESCRIPTION OF ILLUSTRATIVE EMBODIMENTS

To make the objectives, technical solutions, and advantages of the present invention clearer, the following further describes the embodiments of the present invention in detail with reference to the accompanying drawings.

Figure 1A:
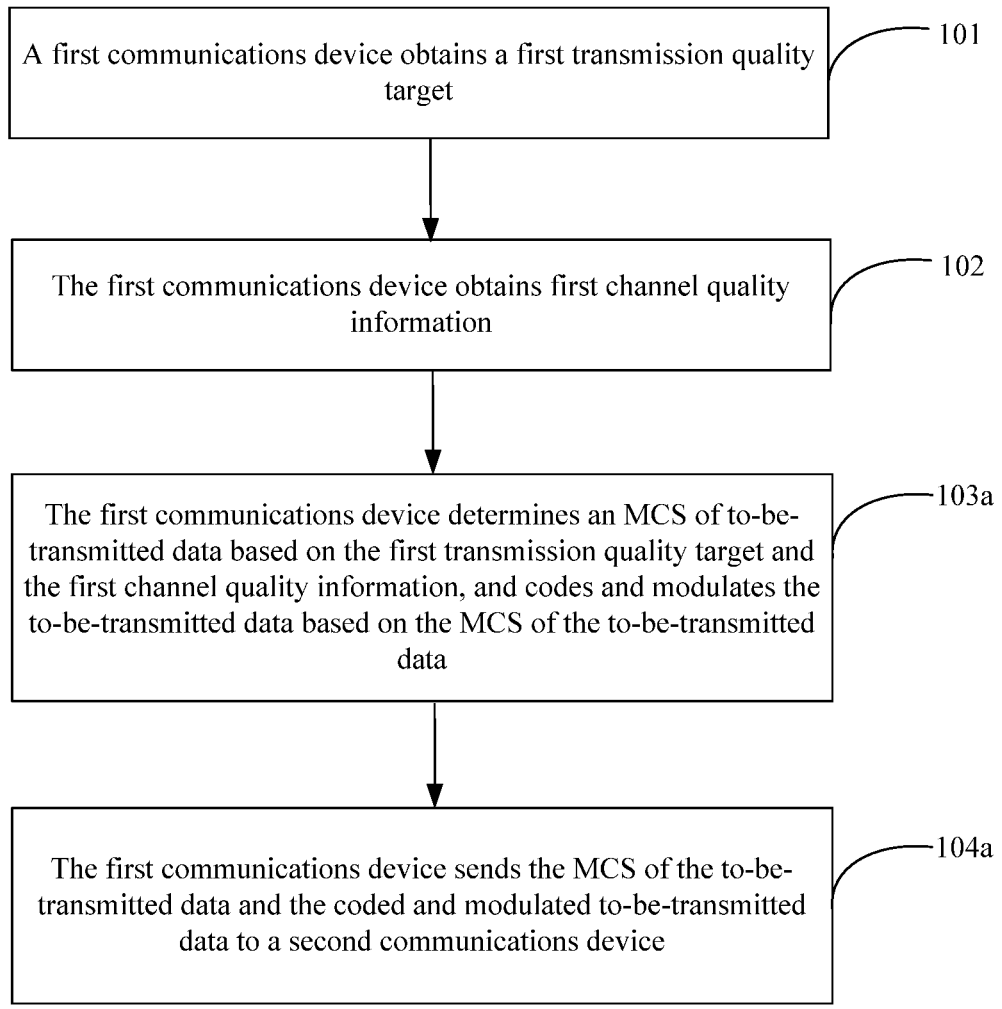
FIG. 1a is a schematic flowchart of a data transmission method according to an embodiment of the present invention.

An embodiment of the present invention provides a data transmission method. Referring to FIG. 1a, the method includes the following steps.

101. A first communications device obtains a first transmission quality target.

The first transmission quality target is used to indicate a transmission quality target of to-be-transmitted data. Herein, the first communications device may be a base station (BS), a radio access point (AP), a terminal device, or the like, and a second communications device may be a terminal device, a mobile station (MS), a base station, or the like. In a Long Term Evolution (LTE) system, a base station may be an evolved NodeB (eNB), and a terminal device may be user equipment (User Equipment).

Optionally, before step 101 or step 102, the first communications device may obtain the first transmission quality target. Specifically, the first communications device may obtain the first transmission quality target in the following two manners.

Manner 1: The first communications device determines the first transmission quality target from a plurality of transmission quality targets based on a delay requirement and a reliability requirement of the to-be-transmitted data. A lower delay requirement of the to-be-transmitted data indicates a higher first transmission quality target. A higher reliability requirement of the to-be-transmitted data indicates a higher first transmission quality target. For example, a transmission quality target of a common service is BLER<0.1, and a transmission quality target of a low-delay and high-reliability service is BLER<0.00001. In manner 1, the first communications device may further send the first transmission quality target to the second communications device.

Optionally, a method for determining the first transmission quality target is as follows: If a delay of the to-be-transmitted data is less than or equal to a sum of an air interface transmission delay and a fixed value, the first transmission quality target is set to be a block error rate required by the to-be-transmitted data. Assuming that the air interface transmission delay is 0.5 ms, the fixed value is set to 0.5 ms, the delay of the to-be-transmitted data is 1 ms, and the block error rate of the to-be-transmitted data is 0.00001, the first transmission quality target of the to-be-transmitted data is that the block error rate (BLER) of the to-be-transmitted data is less than 0.00001. If the delay of the to-be-transmitted data is 10 ms, and the block error rate of the to-be-transmitted data is 0.00001, the first transmission quality target of the to-be-transmitted data is BLER<0.1, and a retransmission may be performed to further reduce the block error rate of the to-be-transmitted data.

Alternatively, a method for determining the first transmission quality target is as follows: A system includes at least two transmission quality targets. One transmission quality target is BLER<0.1, and another transmission quality target is BLER<0.00001. If the to-be-transmitted data is of a common service, the transmission quality target is BLER<0.1. If the to-be-transmitted data is of an ultra-low-delay and high-reliability service, the transmission quality target is BLER<0.00001. The transmission quality target herein is a transmission quality target of one air interface transmission. Another possible method for determining the first transmission quality target is as follows: A system includes at least three transmission quality targets. One transmission quality target is BLER<0.1, one transmission quality target is BLER<0.00001, and another transmission quality target is BLER<0.0000001. If an end-to-end transmission delay of a to-be-transmitted data is greater than 5 ms, the transmission quality target is BLER<0.1. If an end-to-end transmission delay of a to-be-transmitted service is less than 1 ms, the transmission quality target is BLER<0.0000001. If an end-to-end transmission delay of a to-be-transmitted service is between 1 ms and 5 ms, the transmission quality target is BLER<0.00001.

In a preferable application scenario, the first communications device may send the first transmission quality target to the second communications device, and receive first channel quality information sent by the second communications device. In this way, the second communications device receives the first transmission quality target, and the second communications device may measure a channel based on the first transmission quality target, to directly obtain the first channel quality information, and send the first channel quality information to the first communications device.

Manner 2: The first communications device receives the first transmission quality target sent by the second communications device. The second communications device may determine the first transmission quality target from a plurality of transmission quality targets based on a delay requirement and a reliability requirement of the to-be-transmitted data. For example, a lower delay requirement of the to-be-transmitted data indicates a higher first transmission quality target, and a higher reliability requirement of the to-be-transmitted data indicates a higher first transmission quality target. For example, a transmission quality target of a common service is BLER<0.1, and a transmission quality target of a low-delay and high-reliability service is BLER<0.00001. The second communications device may determine the first transmission quality target according to the method for determining the first transmission quality target by the first communications device in manner 1. Details are not repeated herein. Alternatively, the second communications device does not need to determine the first transmission quality target (corresponding to a solution that the second communications device measures a channel based on a second transmission quality target in a second application scenario in step 102). The second transmission quality target is a transmission quality target pre-stored by the first communications device and the second communications device. The second transmission quality target may be a transmission quality target agreed upon by the first communications device and the second communications device. For example, BLER<0.1 is used as the second transmission quality target.

It should be noted that in the foregoing two manners for obtaining the first transmission quality target, the transmission quality target of data transmission may be carried in physical layer control signaling or higher layer signaling for transmission. The higher layer signaling may be Media Access Control (MAC) signaling, radio resource control (RRC) signaling, or the like.

In addition, an effective time may be set for the first transmission quality target. For example, the physical layer signaling may be used to indicate an effective time of a transmission quality target, or the higher layer signaling may be used to indicate effective times of a plurality of one-time transmission quality targets.

When both the physical layer signaling and the higher layer signaling indicate the first transmission quality target, a priority may be predefined. For example, when the physical layer signaling and the higher layer signaling are received simultaneously, the indication of the physical layer signaling takes priority. Alternatively, if the physical layer signaling indicating the first transmission quality target is received within the effective time that is of the transmission quality target of the to-be-transmitted data and that is indicated by the higher layer signaling, the indication of the physical layer signaling takes priority.

102. The first communications device obtains first channel quality information.

The first channel quality information is used to indicate quality of a channel between the first communications device and the second communications device, and the first channel quality information is obtained based on the first transmission quality target. Optionally, the first transmission quality target may include at least one of a target block error rate (BLER) and a target signal-to-noise ratio (SNR). The first channel quality information may include at least one of a channel quality indicator (CQI), a precoding matrix indicator (PMI), and a rank indication (RI).

Optionally, three specific application scenarios are listed herein to describe how to obtain the first channel quality information:

In a first scenario, the first communications device receives the first channel quality information sent by the second communications device.

In this scenario, the second communications device receives the first transmission quality target, measures a channel based on the first transmission quality target, generates the first channel quality information, and sends the first channel quality information to the first communications device.

In the second application scenario, the first communications device receives second channel quality information sent by the second communications device, and obtains the first channel quality information based on the second channel quality information. The second channel quality information is the quality that is of the channel between the first communications device and the second communications device and that is measured by the second communications device based on the second transmission quality target. When determining that the second transmission quality target is the same as the first transmission quality target, the first communications device uses the second channel quality information as the first channel quality information. When determining that the second transmission quality target is different from the first transmission quality target, the first communications device obtains the first channel quality information based on the second channel quality information.

Herein, Table 1 is used as an example to describe the second application scenario. Referring to Table 1, Table 1 shows two transmission quality targets: BLER<0.1 and BLER<0.00001. The first channel quality information includes the CQI, represented by a CQI index in Table 1. For example, BLER<0.00001 is the first transmission quality target, and BLER<0.1 is the second transmission quality target. For example, the second channel quality information sent by the second communications device and received by the first communications device indicates that the CQI is 6. However, the second transmission quality target is different from the first transmission quality target. The second channel quality information is obtained through channel measurement by the second communications device based on the second transmission quality target (BLER<0.1). Therefore, it is found in a column corresponding to the second transmission quality target (BLER<0.1) that, when the CQI is 6, a corresponding SNR is 3. Then, it is found in a column corresponding to the first transmission quality target (BLER<0.00001) that an SNR that is less than or equal to 3 and closest to 3 is 2.05. Finally, it is found in a column corresponding to the CQI index that, when the SNR (BLER<0.00001) is 2.05, a corresponding CQI is 3. Based on this, it can be determined that the first channel quality information is CQI=3.

TABLE 1

| CQI index | SNR (BLER < 0.1) | SNR (BLER < 0.00001) |
|---|---|---|
| 1 | −7 | −1.8 |
| 2 | −5 | 0.2 |
| 3 | −3.15 | 2.05 |
| 4 | −1 | 4.2 |
| 5 | 1 | 6.2 |
| 6 | 3 | 8.2 |
| 7 | 5 | 10.2 |
| 8 | 6.9 | 12.1 |
| 9 | 8.9 | 14.1 |
| 10 | 10.85 | 16.05 |
| 11 | 12.6 | 17.8 |
| 12 | 14.45 | 19.65 |
| 13 | 16.15 | 21.35 |
| 14 | 18.15 | 23.35 |
| 15 | 20 | 25.2 |

In a third application scenario, the first communications device measures channel quality of a sounding signal sent by the second communications device, and generates the first channel quality information.

There is no necessary sequence between step 101 and step 102.

103a. The first communications device determines a modulation and coding scheme (MCS) of to-be-transmitted data based on the first transmission quality target and the first channel quality information, and codes and modulates the to-be-transmitted data based on the MCS of the to-be-transmitted data.

The first communications device may determine the MCS of the to-be-transmitted data according to a preset mapping relationship or a preset mapping list and based on the first transmission quality target and the first channel quality information. Table 1 includes a mapping relationship between the first transmission quality target and the first channel quality information. Table 2 shows a specific mapping relationship between the first channel quality information and the MCS of the to-be-transmitted data. The MCS may include quadrature phase shift keying (QPSK), 16 quadrature amplitude modulation (QAM), or 64 QAM.

TABLE 2

| CQI index | Modulation scheme | Bit rate × 1024 | Efficiency |
|---|---|---|---|
| 0 | | | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

It should be noted that there are a plurality of transmission quality targets in embodiments of the present invention, and different mapping lists may be used for different transmission quality targets. For example, for two transmission quality targets BLER<0.1 and BLER<0.00001, when the first transmission quality target is BLER<0.1, Table 2 may be used; when the first transmission quality target is BLER<0.00001, Table 3 may be used. The MCS in Table 3 may include binary phase shift keying (BPSK), the QPSK, the 16 QAM, the 64 QAM, or 256 QAM.

TABLE 3

| CQI index | Modulation scheme | Bit rate × 1024 | Efficiency |
|---|---|---|---|
| 0 | | out of range | |
| 1 | BPSK | 50 | 0.0048 |
| 2 | BPSK | 76 | 0.07421 |
| 3 | QPSK | 78 | 0.1523 |
| 4 | QPSK | 193 | 0.377 |
| 5 | QPSK | 308 | 0.6016 |
| 6 | QPSK | 449 | 0.877 |
| 7 | 16QAM | 378 | 1.4766 |
| 8 | 16QAM | 490 | 1.9141 |
| 9 | 64QAM | 466 | 2.7305 |
| 10 | 64QAM | 567 | 3.3223 |
| 11 | 64QAM | 666 | 3.9023 |
| 12 | 64QAM | 772 | 4.5234 |
| 13 | 64QAM | 873 | 5.1152 |
| 14 | 256QAM | 797 | 6.2266 |
| 15 | 256QAM | 948 | 7.4063 |

104a. The first communications device sends the MCS of the to-be-transmitted data and the coded and modulated to-be-transmitted data to a second communications device.

Figure 1B:
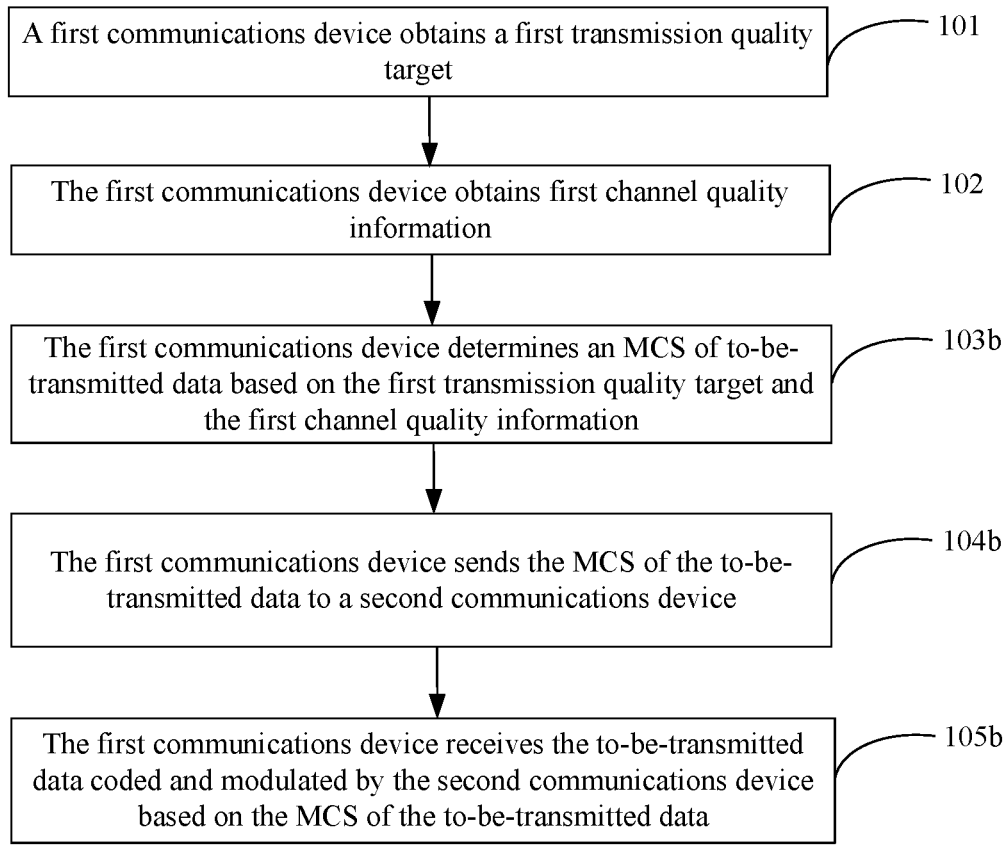
FIG. 1b is a schematic flowchart of another data transmission method according to an embodiment of the present invention.

FIG. 1a is a schematic flowchart of data transmission from the first communications device to the second communications device. Referring to FIG. 1b, FIG. 1b is a schematic flowchart of data transmission from the second communications device to the first communications device. Another data transmission method shown in FIG. 1b includes the following steps.

101. A first communications device obtains a first transmission quality target.

102. The first communications device obtains first channel quality information.

The first channel quality information is used to indicate quality of a channel between the first communications device and a second communications device, and the first channel quality information is obtained based on the first transmission quality target.

103b. The first communications device determines a modulation and coding scheme (MCS) of to-be-transmitted data based on the first transmission quality target and the first channel quality information.

104b. The first communications device sends the MCS of the to-be-transmitted data to a second communications device.

105b. The first communications device receives the to-be-transmitted data coded and modulated by the second communications device based on the MCS of the to-be-transmitted data.

Preferably, the first communications device may be a base station, and the second communications device may be UE. In this case, step 101 to step 104a are performed in a downlink data transmission scenario, and step 101 to step 105b are performed in an uplink data transmission scenario.

In a current system, an adaptive coding and modulation technology is usually used to improve spectrum utilization while ensuring transmission quality. In adaptive coding and modulation, a communications receive end measures channel quality, and feeds back the channel quality to a transmit end, and the transmit end selects, based on a preset transmission quality target (for example, a block error rate is 10%), a modulation and coding scheme most appropriate to the preset transmission quality target, codes and modulates a to-be-sent signal, and sends the signal to the receive end. Alternatively, the communications receive end measures channel quality, suggests a modulation and coding scheme based on a transmission quality target agreed upon with the transmit end, and feeds back the modulation and coding scheme to the transmit end. The transmit end performs sending based on the suggested modulation and coding scheme. Generally, a transmission quality target is agreed upon. For example, a transmission quality target of one air interface transmission is that the block error rate is less than 0.1. For a service having a relatively high reliability requirement, a retransmission may be performed to further reduce the block error rate. For example, in a 3GPP LTE system, a maximum of eight retransmissions may be performed. However, a plurality of retransmissions may cause an increase in a transmission delay, and as a result, a requirement of a service that requires both an extremely low delay and relatively high reliability cannot be met. However, if a requirement on the block error rate is raised, for example, the block error rate is enhanced to BLER<0.00001, a relatively low bit rate and a lower-order modulation and coding scheme are required correspondingly. This reduces system transmission efficiency. Consequently, setting only one transmission quality target of one air interface transmission in the current system cannot meet a low delay and high reliability requirement and a system efficiency requirement at the same time.

In embodiments of the present invention, the transmission quality target suitable for the to-be-transmitted data may be flexibly determined, and then the first channel quality information is obtained based on the transmission quality target, and the MCS that meets the transmission quality target of the to-be-transmitted data is determined, thereby meeting a service requirement of data transmission. For example, for data transmission requiring a low delay and high reliability, a relatively high transmission quality target may be selected, corresponding to a lower-order modulation scheme and a relatively low bit rate, while for data transmission that does not have a high delay requirement, a relatively low transmission quality target may be selected, corresponding to a higher-order modulation scheme and a relatively high bit rate. In this case, requirements of different services on the delay and reliability are met while system efficiency is ensured.

According to the data transmission method provided in this embodiment of the present invention, the first communications device obtains the first transmission quality target and the first channel quality information; determines the modulation and coding scheme (MCS) of the to-be-transmitted data based on the first transmission quality target and the first channel quality information; sends the MCS of the to-be-transmitted data to the second communications device; and codes and modulates the to-be-transmitted data based on the MCS of the to-be-transmitted data and sends the coded and modulated to-be-transmitted data to the second communications device, or receives the to-be-transmitted data coded and modulated by the second communications device based on the MCS of the to-be-transmitted data. Because the MCS of the to-be-transmitted data is determined based on the first transmission quality target and the first channel quality information, an MCS is determined, for data transmitted each time, based on a transmission quality target and first channel quality information of the data transmitted each time, resolving a problem that the transmission quality target cannot meet the requirement of the low-delay and high-reliability service and the system efficiency requirement at the same time.

Figure 2A:
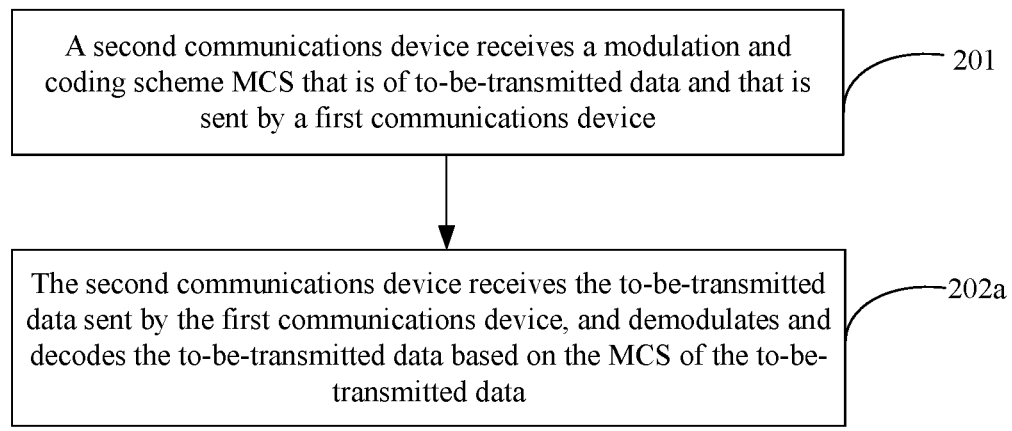
FIG. 2a is a schematic flowchart of a data transmission method according to another embodiment of the present invention.

With reference to the embodiment corresponding to FIG. 1a, another embodiment of the present invention provides a data transmission method. The method is a method on the second communications device side and is corresponding to the data transmission method described in the embodiment corresponding to FIG. 1a. As shown in FIG. 2a, the method includes the following steps.

201. A second communications device receives a modulation and coding scheme (MCS) that is of to-be-transmitted data and that is sent by a first communications device.

The MCS of the to-be-transmitted data is determined by the first communications device based on a first transmission quality target and first channel quality information.

Optionally, before step 201, the method may further include: obtaining, by the second communications device, the first transmission quality target, and generating the first channel quality information based on the first transmission quality target; and sending, by the second communications device, the first channel quality information to the first communications device.

Specifically, in a possible implementation, the second communications device may determine the first transmission quality target from a plurality of transmission quality targets based on a delay requirement and a reliability requirement of the to-be-transmitted data. A lower delay requirement of the to-be-transmitted data indicates a higher first transmission quality target. A higher reliability requirement of the to-be-transmitted data indicates a higher first transmission quality target.

Further optionally, the second communications device may send the first transmission quality target to the first communications device.

In another possible implementation, the second communications device may receive the first transmission quality target sent by the first communications device.

Optionally, before step 201, the method may further include: measuring, by the second communications device, a channel based on a second transmission quality target, and generating second channel quality information; and sending, by the second communications device, the second channel quality information to the first communications device.

In addition, optionally, before step 201, the second communications device may determine the first transmission quality target from a plurality of transmission quality targets based on a delay requirement and a reliability requirement of the to-be-transmitted data, and send the first transmission quality target to the first communications device, so that the first communications device obtains the first channel quality information. A lower delay requirement of the to-be-transmitted data indicates a higher first transmission quality target. A higher reliability requirement of the to-be-transmitted data indicates a higher first transmission quality target.

202a. The second communications device receives the to-be-transmitted data sent by the first communications device, and demodulates and decodes the to-be-transmitted data based on the MCS of the to-be-transmitted data.

Figure 2B:
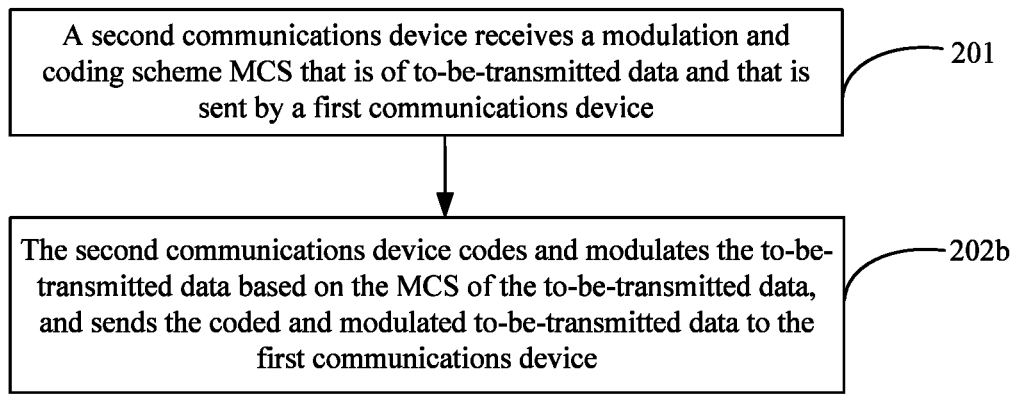
FIG. 2b is a schematic flowchart of another data transmission method according to another embodiment of the present invention.

FIG. 2a is a schematic flowchart of data transmission from the first communications device to the second communications device. Referring to FIG. 2b, FIG. 2b is a schematic flowchart of data transmission from the second communications device to the first communications device. Another data transmission method shown in FIG. 2b includes the following steps.

201. A second communications device receives a modulation and coding scheme (MCS) that is of to-be-transmitted data and that is sent by a first communications device.

The MCS of the to-be-transmitted data is determined by the first communications device based on a first transmission quality target and first channel quality information.

202b. The second communications device codes and modulates the to-be-transmitted data based on the MCS of the to-be-transmitted data, and sends the coded and modulated to-be-transmitted data to the first communications device.

For step 202a or 202b, optionally, the MCS of the to-be-transmitted data may be determined by the first communications device according to a preset mapping relationship or a preset mapping list and based on the first transmission quality target and the first channel quality information.

Optionally, the transmission quality target may include at least one of a target block error rate (BLER) and a target signal-to-noise ratio (SNR), and the first channel quality information may include at least one of a channel quality indicator (CQI), a precoding matrix indicator (PMI), and a rank indication (RI).

According to the data transmission method provided in this embodiment of the present invention, the second communications device receives the modulation and coding scheme (MCS) that is of the to-be-transmitted data and that is sent by the first communications device; and receives the to-be-transmitted data sent by the first communications device and demodulates and decodes the to-be-transmitted data based on the MCS of the to-be-transmitted data, or codes and modulates the to-be-transmitted data based on the MCS of the to-be-transmitted data and sends the coded and modulated to-be-transmitted data to the first communications device. Because the MCS of the to-be-transmitted data is determined based on the first transmission quality target and the first channel quality information, an MCS is determined, for data transmitted each time, based on a transmission quality target and first channel quality information of the data transmitted each time, resolving a problem that the transmission quality target cannot meet a requirement of a low-delay and high-reliability service and a system efficiency requirement at the same time.

Based on the foregoing embodiments corresponding to FIGS. 1a and 1b and FIGS. 2a and 2b, in an embodiment of the present invention, four specific application scenarios are used as examples to describe the data transmission methods described in the embodiments corresponding to FIG. 1 and FIG. 2. In the four application scenarios, the first communications device may be a base station, and the second communications device may be UE. Data transmission between the base station and the UE is used as an example for description. Details are as follows.

Figure 3A:
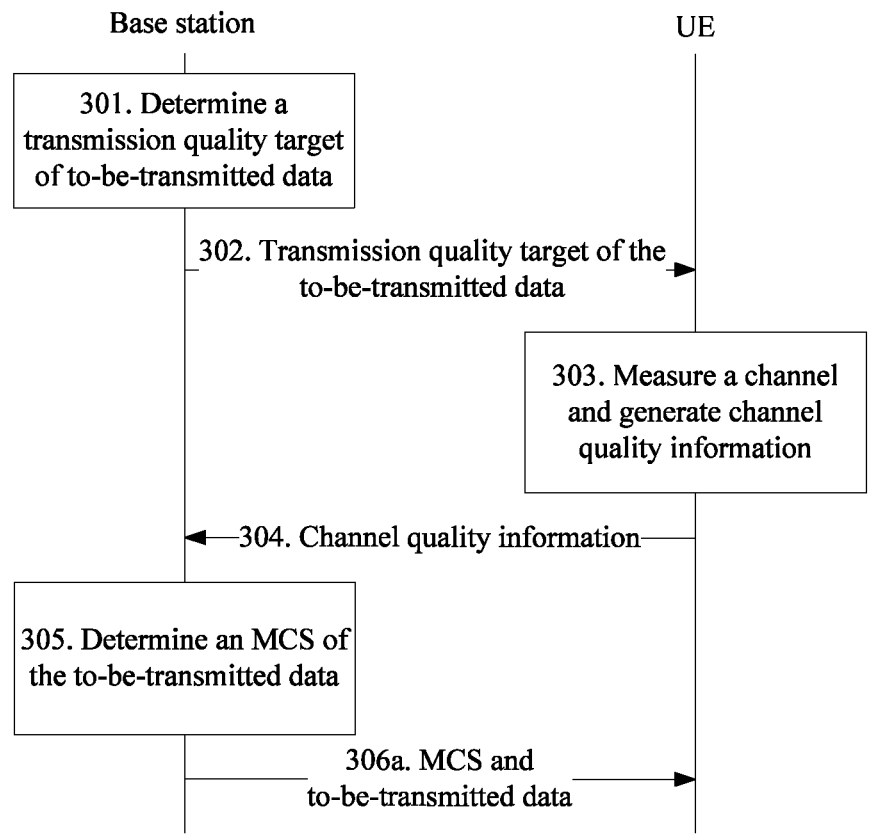
FIG. 3a is a schematic flowchart of a downlink data transmission method in a first application scenario according to an embodiment of the present invention.
Figure 3B:
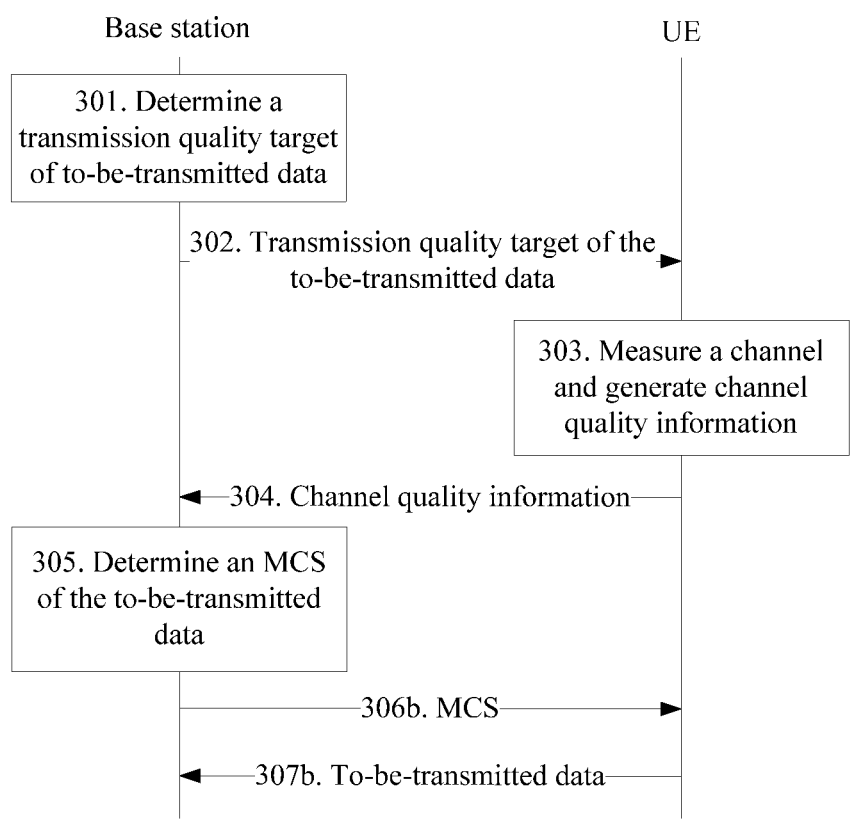
FIG. 3b is a schematic flowchart of an uplink data transmission method in a first application scenario according to an embodiment of the present invention.

In a first application scenario, referring to FIG. 3a and FIG. 3b, FIG. 3a shows a downlink data transmission process, and FIG. 3b shows an uplink data transmission process. Specifically, a data transmission method provided in this embodiment of the present invention includes the following steps.

301. The base station determines a first transmission quality target from a plurality of transmission quality targets.

302. The base station sends the first transmission quality target to the UE.

303. The UE measures a channel based on the first transmission quality target sent by the base station, and generates first channel quality information.

304. The UE sends the first channel quality information to the base station.

305. The base station determines an MCS of to-be-transmitted data based on the first channel quality information.

During downlink data transmission, the method further includes the following step.

306a. The base station sends, to the UE, the MCS of the to-be-transmitted data and the to-be-transmitted data coded and modulated based on the MCS of the to-be-transmitted data.

During uplink data transmission, the method further includes the following steps.

306b. The base station sends the MCS of the to-be-transmitted data to the UE.

307b. After coding and modulating the to-be-transmitted data based on the MCS that is of the to-be-transmitted data and that is sent by the base station, the UE sends the coded and modulated to-be-transmitted data to the base station.

Figure 4A:
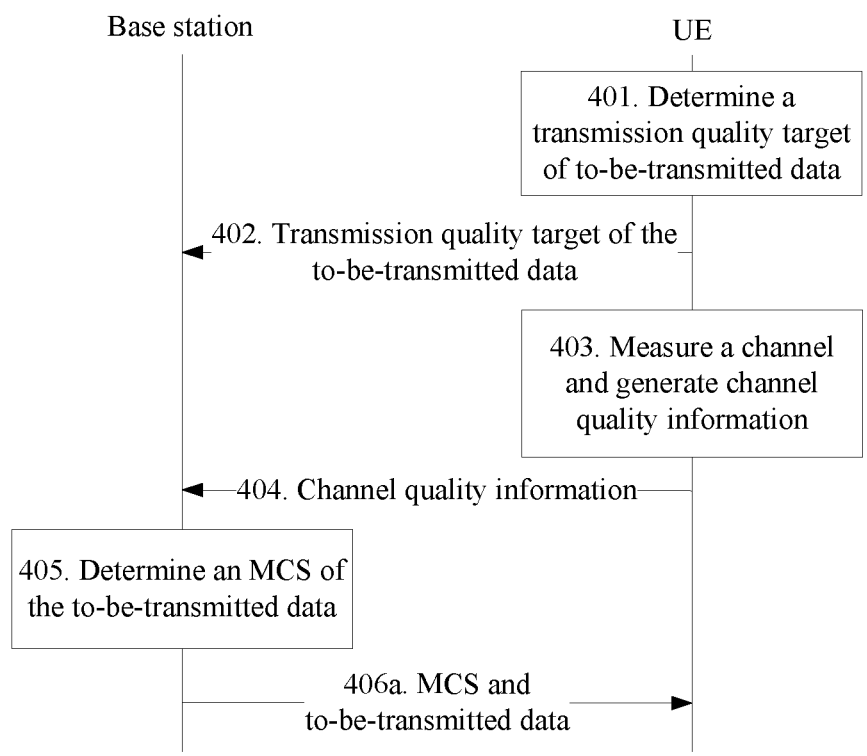
FIG. 4a is a schematic flowchart of a downlink data transmission method in a second application scenario according to an embodiment of the present invention.
Figure 4B:
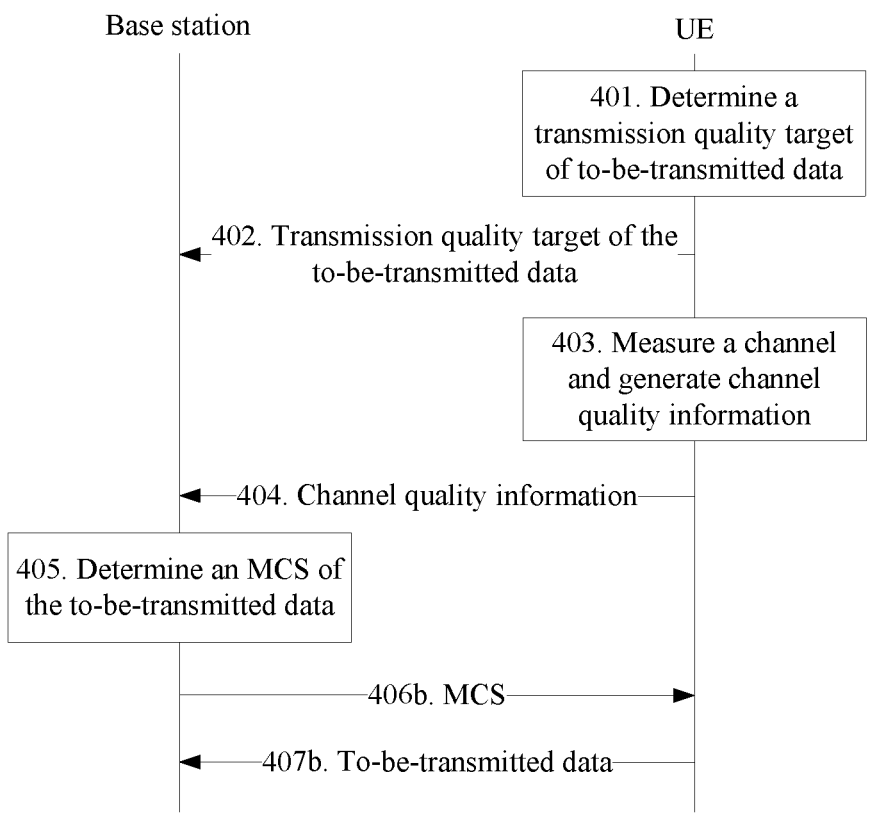
FIG. 4b is a schematic flowchart of an uplink data transmission method in a second application scenario according to an embodiment of the present invention.

In a second application scenario, referring to FIG. 4a and FIG. 4b, FIG. 4a shows a downlink data transmission process, and FIG. 4b shows an uplink data transmission process. Specifically, a data transmission method provided in this embodiment of the present invention includes the following steps.

401. The UE determines a first transmission quality target from a plurality of transmission quality targets.

402. The UE sends the first transmission quality target to the base station.

403. The UE measures a channel based on the first transmission quality target, and generates first channel quality information.

404. The UE sends the first channel quality information to the base station.

405. The base station determines an MCS of to-be-transmitted data based on the first channel quality information.

During downlink data transmission, the method further includes the following step.

406a. The base station sends, to the UE, the MCS of the to-be-transmitted data and the to-be-transmitted data coded and modulated based on the MCS of the to-be-transmitted data.

During uplink data transmission, the method further includes the following steps.

406b. The base station sends the MCS of the to-be-transmitted data to the UE.

407b. After coding and modulating the to-be-transmitted data based on the MCS that is of the to-be-transmitted data and that is sent by the base station, the UE sends the coded and modulated to-be-transmitted data to the base station.

Figure 5A:
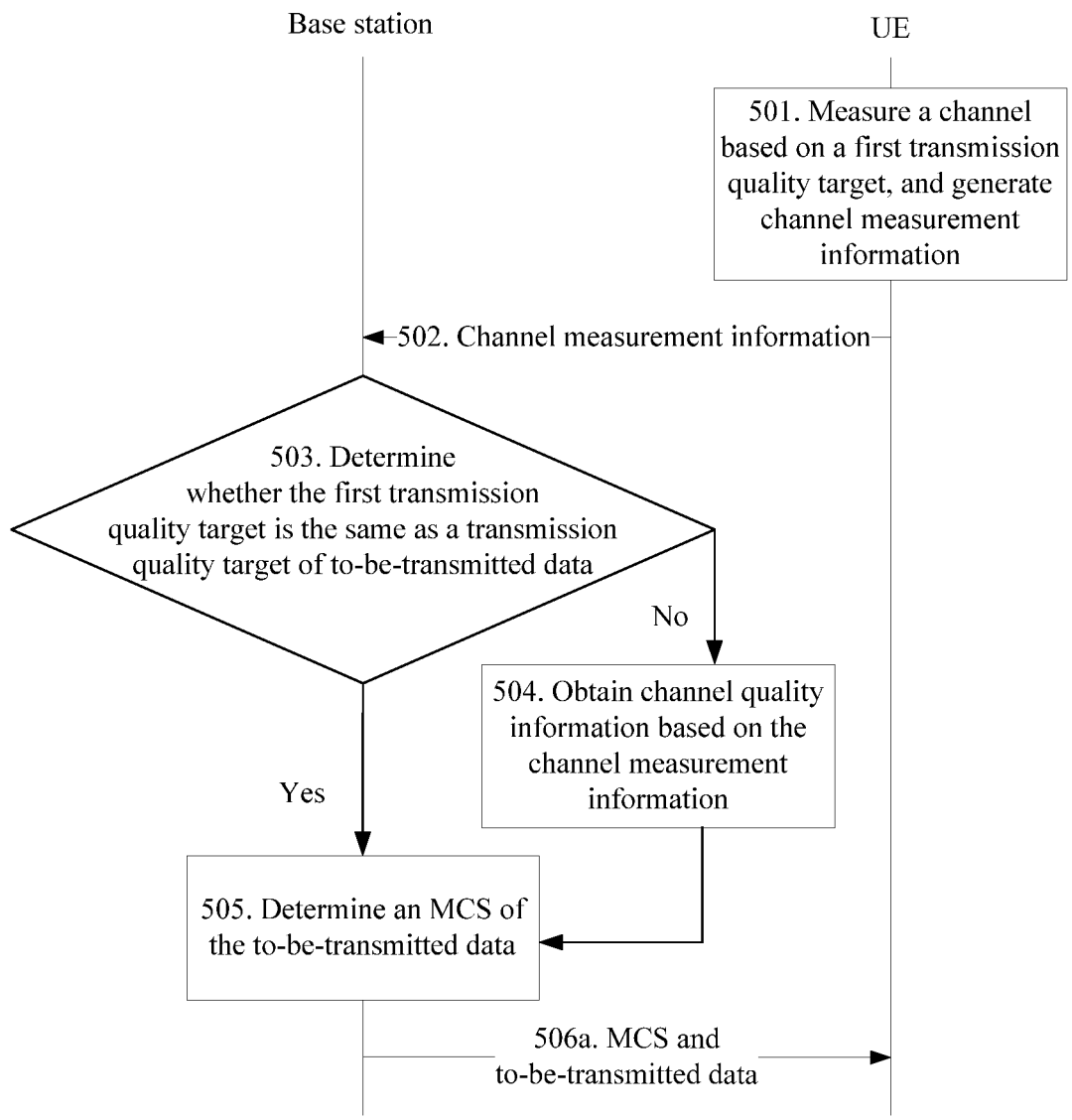
FIG. 5a is a schematic flowchart of a downlink data transmission method in a third application scenario according to an embodiment of the present invention.
Figure 5B:
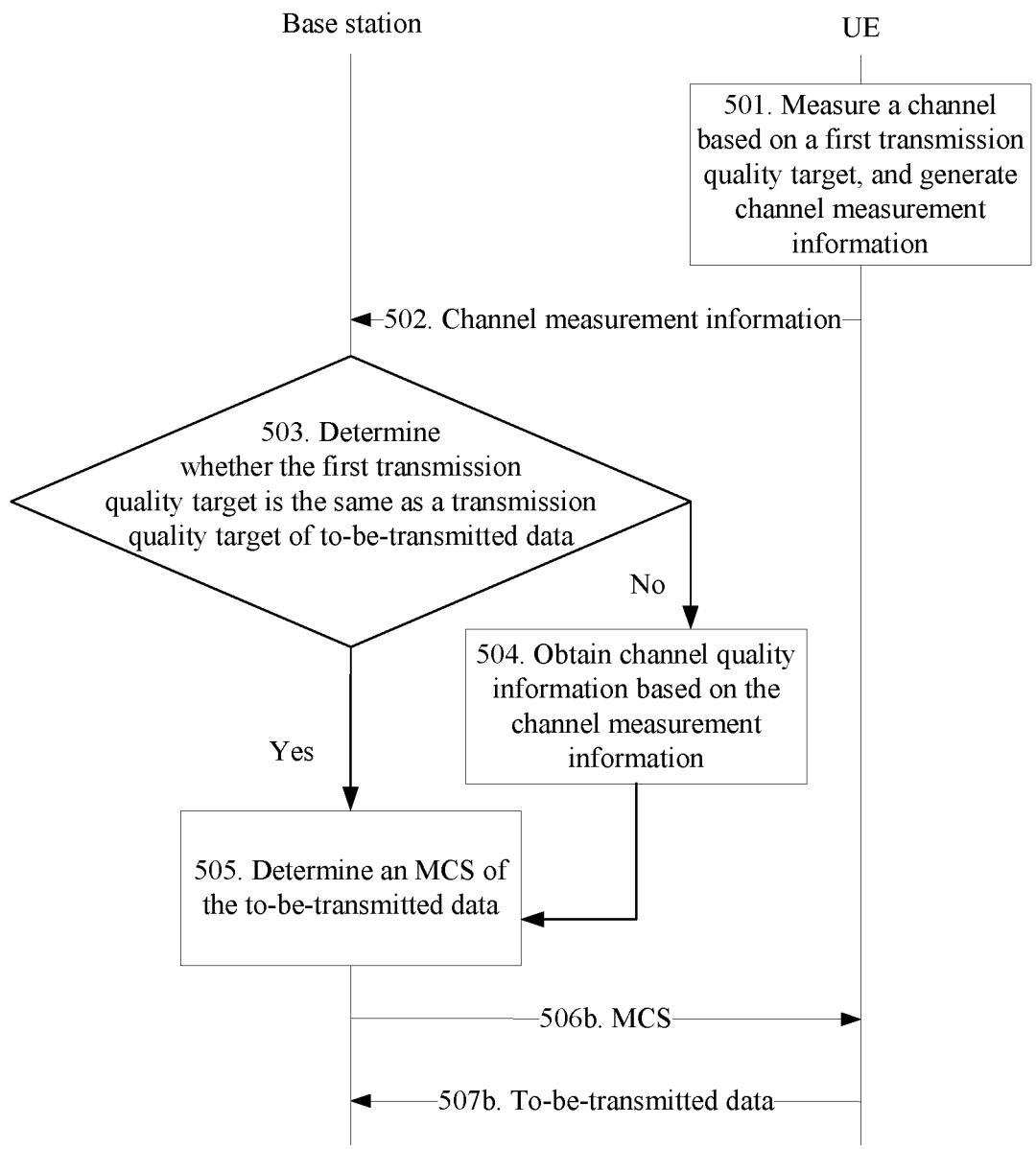
FIG. 5b is a schematic flowchart of an uplink data transmission method in a third application scenario according to an embodiment of the present invention.

In a third application scenario, referring to FIG. 5a and FIG. 5b, FIG. 5a shows a downlink data transmission process, and FIG. 5b shows an uplink data transmission process. A data transmission method provided in this embodiment of the present invention includes the following steps.

501. The UE measures a channel based on a second transmission quality target, and generates second channel quality information.

502. The UE sends the second channel quality information to the base station.

503. The base station determines whether the second transmission quality target is the same as a first transmission quality target.

When the second transmission quality target is different from the first transmission quality target, step 504 is performed before step 505 is performed. When the second transmission quality target is the same as the first transmission quality target, step 505 is directly performed.

504. The base station obtains first channel quality information based on the second channel quality information.

The second channel quality information is obtained through measurement based on the second transmission quality target, and the base station converts the second channel quality information to the first channel quality information specific to the first transmission quality target.

505. The base station determines an MCS of to-be-transmitted data based on the first channel quality information.

During downlink data transmission, the method further includes the following step.

506a. The base station sends, to the UE, the MCS of the to-be-transmitted data and the to-be-transmitted data coded and modulated based on the MCS of the to-be-transmitted data.

During uplink data transmission, the method further includes the following steps.

506b. The base station sends the MCS of the to-be-transmitted data to the UE.

507b. After coding and modulating the to-be-transmitted data based on the MCS that is of the to-be-transmitted data and that is sent by the base station, the UE sends the coded and modulated to-be-transmitted data to the base station.

Figure 6A:
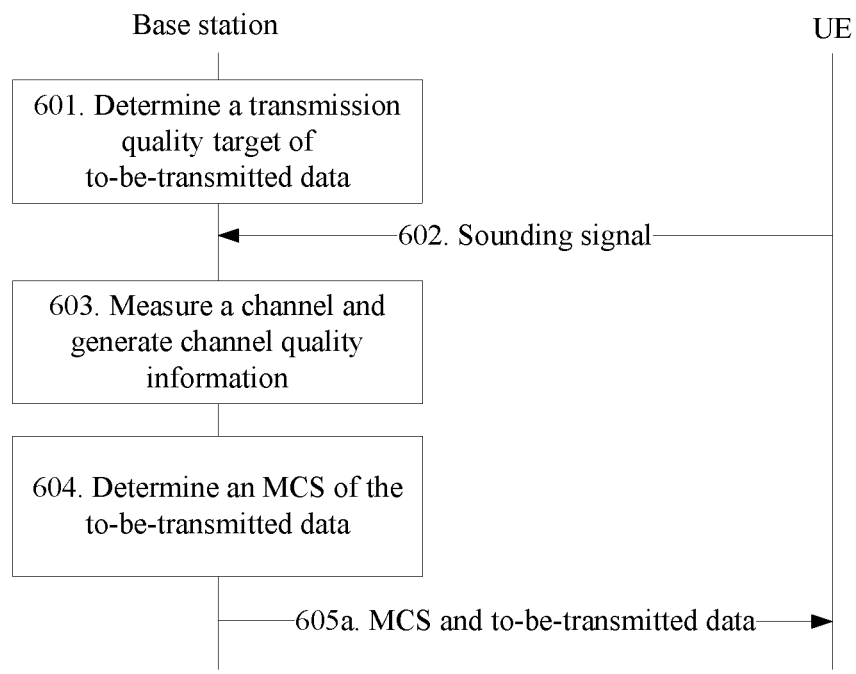
FIG. 6a is a schematic flowchart of a downlink data transmission method in a fourth application scenario according to an embodiment of the present invention.
Figure 6B:
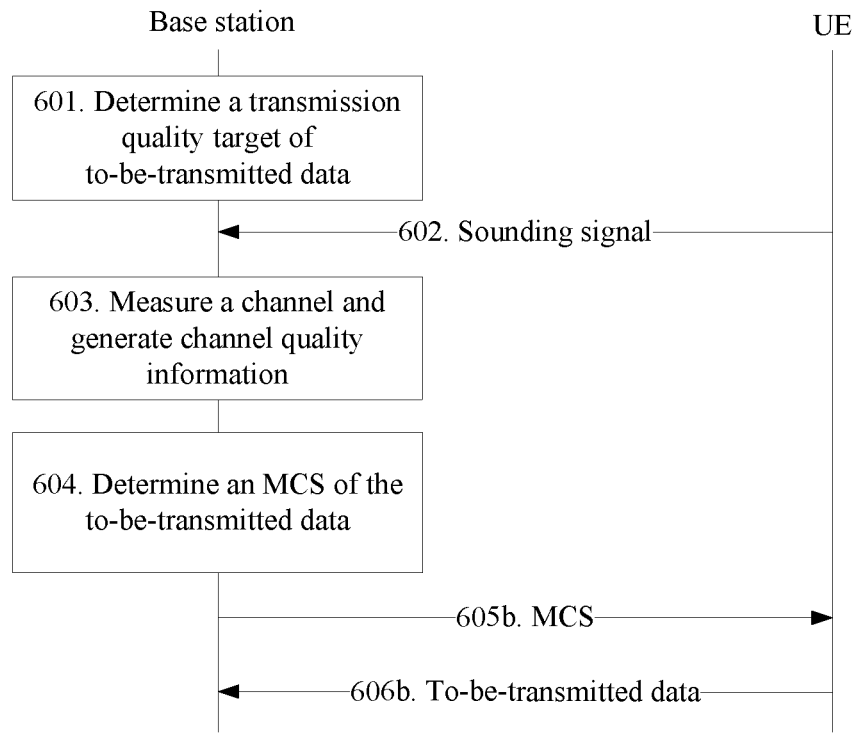
FIG. 6b is a schematic flowchart of an uplink data transmission method in a fourth application scenario according to an embodiment of the present invention.

In a fourth application scenario, referring to FIG. 6a and FIG. 6b, FIG. 6a shows a downlink data transmission process, and FIG. 6b shows an uplink data transmission process. A data transmission method provided in this embodiment of the present invention includes the following steps.

601. The base station determines a first transmission quality target from a plurality of transmission quality targets.

602. The UE sends a sounding signal to the base station.

603. The base station measures, based on the first transmission quality target, channel quality of the sounding signal sent by the UE, and generates first channel quality information.

604. The base station determines an MCS of to-be-transmitted data based on the first channel quality information.

During downlink data transmission, the method further includes the following step.

605a. The base station sends, to the UE, the MCS of the to-be-transmitted data and the to-be-transmitted data coded and modulated based on the MCS of the to-be-transmitted data.

During uplink data transmission, the method further includes the following steps.

605b. The base station sends the MCS of the to-be-transmitted data to the UE.

606b. After coding and modulating the to-be-transmitted data based on the MCS that is of the to-be-transmitted data and that is sent by the base station, the UE sends the coded and modulated to-be-transmitted data to the base station.

According to the data transmission method provided in this embodiment of the present invention, the first communications device obtains the first transmission quality target and the first channel quality information; determines the modulation and coding scheme (MCS) of the to-be-transmitted data based on the first transmission quality target and the first channel quality information; sends the MCS of the to-be-transmitted data to the second communications device; and codes and modulates the to-be-transmitted data based on the MCS of the to-be-transmitted data and sends the coded and modulated to-be-transmitted data to the second communications device, or receives the to-be-transmitted data coded and modulated by the second communications device based on the MCS of the to-be-transmitted data. Because the MCS of the to-be-transmitted data is determined based on the first transmission quality target and the first channel quality information, an MCS is determined, for data transmitted each time, based on a transmission quality target and first channel quality information of the data transmitted each time, resolving a problem that the transmission quality target cannot meet a requirement of a low-delay and high-reliability service and a system efficiency requirement at the same time.

Figure 7:
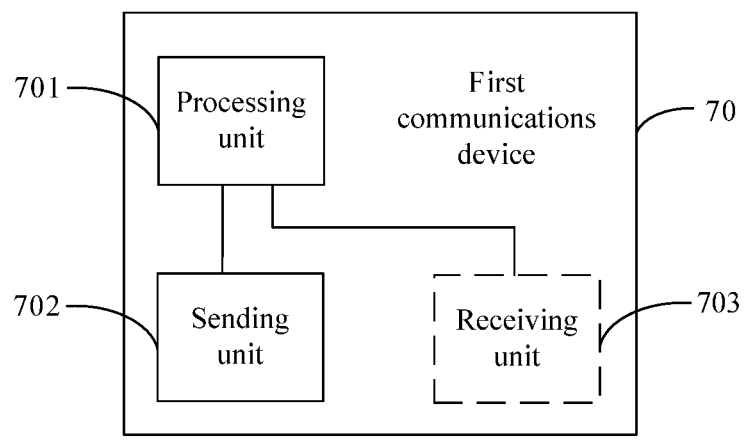
FIG. 7 is a schematic structural diagram of a first communications device according to an embodiment of the present invention.

Based on the data transmission method described in the embodiment corresponding to FIG. 1a, FIG. 3a, FIG. 4a, FIG. 5a, or FIG. 6a, an embodiment of the present invention provides a first communications device, configured to perform the data transmission method described in the embodiment corresponding to FIG. 1a, FIG. 3a, FIG. 4a, FIG. 5a, or FIG. 6a. Referring to FIG. 7, the first communications device 70 includes a processing unit 701 and a sending unit 702.

The processing unit 701 is configured to obtain a first transmission quality target and first channel quality information. The first channel quality information is used to indicate quality of a channel between the first communications device and a second communications device, and the first channel quality information is obtained based on the first transmission quality target.

The processing unit 701 is further configured to: determine a modulation and coding scheme (MCS) of to-be-transmitted data based on the first transmission quality target and the first channel quality information, and code and modulate the to-be-transmitted data based on the MCS of the to-be-transmitted data.

The sending unit 702 is configured to send, to the second communications device, the MCS of the to-be-transmitted data and the to-be-transmitted data coded and modulated by the processing unit 701.

With reference to the data transmission method described in the embodiment corresponding to FIG. 1b, FIG. 3b, FIG. 4b, FIG. 5b, or FIG. 6b, the first communications device 70 further includes a receiving unit 703. The first communications device 70 may be further configured to perform the data transmission method described in the embodiment corresponding to FIG. 1b, FIG. 3b, FIG. 4b, FIG. 5b, or FIG. 6b.

The processing unit 701 is configured to obtain a first transmission quality target and first channel quality information. The first channel quality information is used to indicate quality of a channel between the first communications device and a second communications device, and the first channel quality information is obtained based on the first transmission quality target.

The processing unit 701 is further configured to determine a modulation and coding scheme (MCS) of to-be-transmitted data based on the first transmission quality target and the first channel quality information.

The sending unit 702 is configured to send the MCS of the to-be-transmitted data to the second communications device.

The receiving unit 703 is configured to receive the to-be-transmitted data coded and modulated by the second communications device based on the MCS of the to-be-transmitted data.

Optionally, the processing unit 701 is further configured to determine the first transmission quality target from a plurality of transmission quality targets based on a delay requirement and a reliability requirement of the to-be-transmitted data. A lower delay requirement of the to-be-transmitted data indicates a higher first transmission quality target. A higher reliability requirement of the to-be-transmitted data indicates a higher first transmission quality target.

Further, the sending unit 702 is configured to send the first transmission quality target to the second communications device, and the processing unit 701 is further configured to receive, by using the receiving unit 703, the first channel quality information sent by the second communications device.

Optionally, the receiving unit 703 is further configured to receive second channel quality information sent by the second communications device. The second channel quality information is the quality that is of the channel between the first communications device and the second communications device and that is measured by the second communications device based on a second transmission quality target.

The processing unit 701 is further configured to obtain the first channel quality information based on the second channel quality information.

Optionally, the processing unit 701 is further configured to receive, by using the receiving unit 703, the first transmission quality target sent by the second communications device.

Optionally, the processing unit 701 is further configured to: measure channel quality of a sounding signal sent by the second communications device, and generate the first channel quality information.

Optionally, the processing unit 701 is further configured to determine the MCS of the to-be-transmitted data according to a preset mapping relationship or a preset mapping list and based on the first transmission quality target and the first channel quality information.

Optionally, the processing unit 701 is further configured to receive, by using the receiving unit 703, the first channel quality information sent by the second communications device.

Optionally, the transmission quality target includes at least one of a target block error rate (BLER), a target signal-to-noise ratio (SNR), a service type, and a parameter related to a transmission target. For example, the target BLER is 0.1 or 0.00001, the target signal-to-noise ratio (SNR) is 3 dB or 6 dB, or a service is a low-delay and high-reliability service or a common service. With regard to the parameter related to the transmission target, for example, a number of HARQs, the number of HARQs is zero or eight. If the number of HARQs is zero, a corresponding service is a low-delay and high-reliability service. If the number of HARQs is eight, a corresponding service is a common service.

Optionally, the first channel quality information includes at least one of a channel quality indicator (CQI), a precoding matrix indicator (PMI), and a rank indication (RI).

The first communications device provided in this embodiment of the present invention obtains the first transmission quality target and the first channel quality information; determines the modulation and coding scheme (MCS) of the to-be-transmitted data based on the first transmission quality target and the first channel quality information; sends the MCS of the to-be-transmitted data to the second communications device; and codes and modulates the to-be-transmitted data based on the MCS of the to-be-transmitted data and sends the coded and modulated to-be-transmitted data to the second communications device, or receives the to-be-transmitted data coded and modulated by the second communications device based on the MCS of the to-be-transmitted data. Because the MCS of the to-be-transmitted data is determined based on the first transmission quality target and the first channel quality information, an MCS is determined, for data transmitted each time, based on a transmission quality target and first channel quality information of the data transmitted each time, resolving a problem that the transmission quality target cannot meet a requirement of the low-delay and high-reliability service and a system efficiency requirement at the same time.

Figure 8:
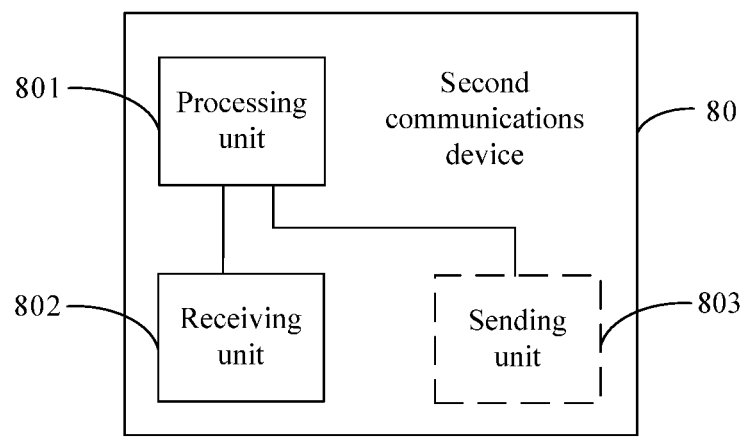
FIG. 8 is a schematic structural diagram of a second communications device according to an embodiment of the present invention.

Based on the data transmission method described in the embodiment corresponding to FIG. 2a, FIG. 3a, FIG. 4a, FIG. 5a, or FIG. 6a, an embodiment of the present invention provides a second communications device, configured to perform the data transmission method described in the embodiment corresponding to FIG. 2a, FIG. 3a, FIG. 4a, FIG. 5a, or FIG. 6a. Referring to FIG. 8, the second communications device 80 includes a processing unit 801 and a receiving unit 802.

The receiving unit 802 is configured to receive a modulation and coding scheme (MCS) that is of to-be-transmitted data and that is sent by a first communications device. The MCS of the to-be-transmitted data is determined by the first communications device based on a first transmission quality target and first channel quality information.

The receiving unit 802 is further configured to receive the to-be-transmitted data sent by the first communications device, and the processing unit 801 is configured to demodulate and decode the to-be-transmitted data based on the MCS of the to-be-transmitted data.

Optionally, the processing unit 801 is further configured to: obtain the first transmission quality target, and generate the first channel quality information based on the first transmission quality target.

The sending unit 803 is further configured to send the first channel quality information to the first communications device.

With reference to the data transmission method described in the embodiment corresponding to FIG. 2b, FIG. 3b, FIG. 4b, FIG. 5b, or FIG. 6b, the second communications device 80 may be further configured to perform the data transmission method described in the embodiment corresponding to FIG. 2b, FIG. 3b, FIG. 4b, FIG. 5b, or FIG. 6b.

The receiving unit 802 is configured to receive a modulation and coding scheme (MCS) that is of to-be-transmitted data and that is sent by a first communications device. The MCS of the to-be-transmitted data is determined by the first communications device based on a first transmission quality target and first channel quality information.

The processing unit 801 is configured to code and modulate the to-be-transmitted data based on the MCS of the to-be-transmitted data.

The sending unit 803 is configured to send the coded and modulated to-be-transmitted data to the first communications device.

Optionally, the processing unit 801 is further configured to determine the first transmission quality target from a plurality of transmission quality targets based on a delay requirement and a reliability requirement of the to-be-transmitted data. A lower delay requirement of the to-betransmitted data indicates a higher first transmission quality target. A higher reliability requirement of the to-be-transmitted data indicates a higher first transmission quality target. Further, the sending unit 803 is configured to send the first transmission quality target to the first communications device.

Alternatively, optionally, the processing unit 801 is further configured to receive, by using the receiving unit 802, the first transmission quality target sent by the first communications device.

In addition, optionally, the processing unit 801 is further configured to determine the first transmission quality target from a plurality of transmission quality targets based on a delay requirement and a reliability requirement of the to-be-transmitted data. A lower delay requirement of the to-be-transmitted data indicates a higher first transmission quality target. A higher reliability requirement of the to-be-transmitted data indicates a higher first transmission quality target.

The sending unit 803 is further configured to send the first transmission quality target to the first communications device.

Optionally, the processing unit 801 is further configured to: measure a channel based on a second transmission quality target, and generate second channel quality information.

The sending unit 803 is further configured to send the second channel quality information to the first communications device.

Optionally, the MCS of the to-be-transmitted data is determined by the first communications device according to a preset mapping relationship or a preset mapping list and based on the first transmission quality target and the first channel quality information.

Optionally, the transmission quality target includes at least one of a target block error rate (BLER), a target signal-to-noise ratio (SNR), a service type, and a parameter related to a transmission target. For example, the target BLER is 0.1 or 0.00001, the target signal-to-noise ratio (SNR) is 3 dB or 6 dB, or a service is a low-delay and high-reliability service or a common service. With regard to the parameter related to the transmission target, for example, a number of HARQs, the number of HARQs is zero or eight. If the number of HARQs is zero, a corresponding service is a low-delay and high-reliability service. If the number of HARQs is eight, a corresponding service is a common service.

Optionally, the first channel quality information includes at least one of a channel quality indicator (CQI), a precoding matrix indicator (PMI), and a rank indication (RI).

The second communications device provided in this embodiment of the present invention receives the modulation and coding scheme (MCS) that is of the to-be-transmitted data and that is sent by the first communications device; and receives the to-be-transmitted data sent by the first communications device and demodulates and decodes the to-be-transmitted data based on the MCS of the to-be-transmitted data, or codes and modulates the to-be-transmitted data based on the MCS of the to-be-transmitted data and sends the coded and modulated to-be-transmitted data to the first communications device. Because the MCS of the to-be-transmitted data is determined based on the first transmission quality target and the first channel quality information, an MCS is determined, for data transmitted each time, based on a transmission quality target and first channel quality information of the data transmitted each time, resolving a problem that the transmission quality target cannot meet a requirement of the low-delay and high-reliability service and a system efficiency requirement at the same time.

Figure 9:
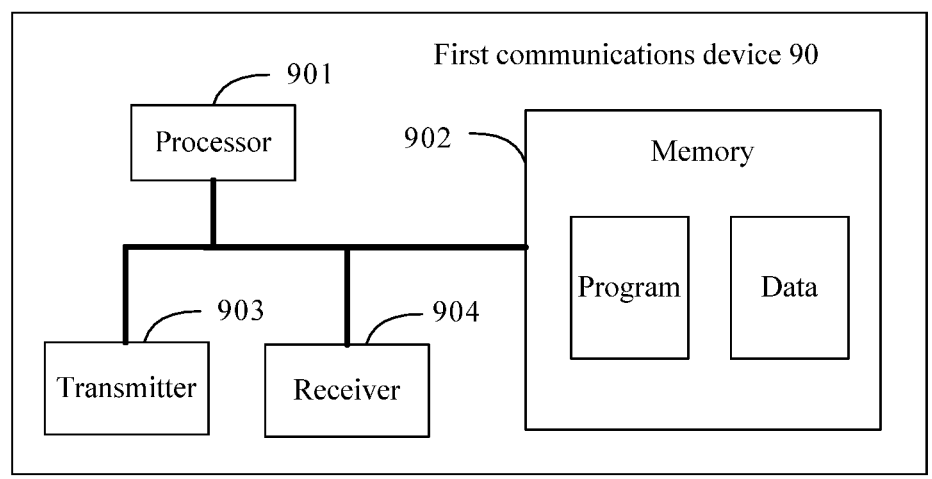
FIG. 9 is a schematic structural diagram of a first communications device according to another embodiment of the present invention.

Based on the data transmission method described in the embodiment corresponding to FIG. 1a, FIG. 3a, FIG. 4a, FIG. 5a, or FIG. 6a, another embodiment of the present invention provides a first communications device, configured to perform the data transmission method described in the embodiment corresponding to FIG. 1a, FIG. 3a, FIG. 4a, FIG. 5a, or FIG. 6a. Referring to FIG. 9, the first communications device 90 includes a processor 901, a memory 902, a transmitter 903, and a receiver 904. The processor 901, the memory 902, the transmitter 903, and the receiver 904 are connected to each other. The memory 902 is configured to store data and a program, and the processor 901 is configured to invoke the program stored in the memory 902 to perform, by using the transmitter 903 and the receiver 904, the data transmission method described in the embodiment corresponding to FIG. 1a, FIG. 3a, FIG. 4a, FIG. 5a, or FIG. 6a.

The processor 901 is configured to obtain a first transmission quality target and first channel quality information. The first channel quality information is used to indicate quality of a channel between the first communications device and a second communications device, and the first channel quality information is obtained based on the first transmission quality target.

The processor 901 is further configured to: determine a modulation and coding scheme (MCS) of to-be-transmitted data based on the first transmission quality target and the first channel quality information, and code and modulate the to-be-transmitted data based on the MCS of the to-be-transmitted data.

The processor 901 is further configured to send, by using the transmitter 903, the MCS of the to-be-transmitted data and the coded and modulated to-be-transmitted data to the second communications device.

With reference to the data transmission method described in the embodiment corresponding to FIG. 1b, FIG. 3b, FIG. 4b, FIG. 5b, or FIG. 6b, the first communications device 90 may be further configured to perform the data transmission method described in the embodiment corresponding to FIG. 1b, FIG. 3b, FIG. 4b, FIG. 5b, or FIG. 6b.

The processor 901 is configured to obtain a first transmission quality target and first channel quality information. The first channel quality information is used to indicate quality of a channel between the first communications device and a second communications device, and the first channel quality information is obtained based on the first transmission quality target.

The processor 901 is further configured to determine a modulation and coding scheme (MCS) of to-be-transmitted data based on the first transmission quality target and the first channel quality information.

The processor is further configured to send the MCS of the to-be-transmitted data to the second communications device by using the transmitter 903.

The processor is further configured to receive, by using the receiver 904, the to-be-transmitted data coded and modulated by the second communications device based on the MCS of the to-be-transmitted data.

Optionally, the processor 901 is further configured to determine the first transmission quality target from a plurality of transmission quality targets based on a delay requirement and a reliability requirement of the to-be-transmitted data. A lower delay requirement of the to-be-transmitted data indicates a higher first transmission quality target. A higher reliability requirement of the to-be-transmitted data indicates a higher first transmission quality target.

Further, the processor 901 is configured to send the first transmission quality target to the second communications device by using the transmitter 903, and the processor 901 is further configured to receive, by using the receiver 904, the first channel quality information sent by the second communications device.

Optionally, the processor 901 is further configured to receive, by using the receiver 904, second channel quality information sent by the second communications device. The second channel quality information is the quality that is of the channel between the first communications device and the second communications device and that is measured by the second communications device based on a second transmission quality target.

The processor 901 is further configured to obtain the first channel quality information based on the second channel quality information.

Optionally, the processor 901 is further configured to receive, by using the receiver 904, the first transmission quality target sent by the second communications device.

Optionally, the processor 901 is further configured to: measure channel quality of a sounding signal sent by the second communications device, and generate the first channel quality information.

Optionally, the processor 901 is further configured to determine the MCS of the to-be-transmitted data according to a preset mapping relationship or a preset mapping list and based on the first transmission quality target and the first channel quality information.

Optionally, the transmission quality target includes at least one of a target block error rate (BLER), a target signal-to-noise ratio (SNR), a service type, and a parameter related to a transmission target. For example, the target BLER is 0.1 or 0.00001, the target signal-to-noise ratio (SNR) is 3 dB or 6 dB, or a service is a low-delay and high-reliability service or a common service. With regard to the parameter related to the transmission target, for example, a number of HARQs, the number of HARQs is zero or eight. If the number of HARQs is zero, a corresponding service is a low-delay and high-reliability service. If the number of HARQs is eight, a corresponding service is a common service.

Optionally, the first channel quality information includes at least one of a channel quality indicator (CQI), a precoding matrix indicator (PMI), and a rank indication (RI).

The first communications device provided in this embodiment of the present invention obtains the first transmission quality target and the first channel quality information; determines the modulation and coding scheme (MCS) of the to-be-transmitted data based on the first transmission quality target and the first channel quality information; sends the MCS of the to-be-transmitted data to the second communications device; and codes and modulates the to-be-transmitted data based on the MCS of the to-be-transmitted data and sends the coded and modulated to-be-transmitted data to the second communications device, or receives the to-be-transmitted data coded and modulated by the second communications device based on the MCS of the to-be-transmitted data. Because the MCS of the to-be-transmitted data is determined based on the first transmission quality target and the first channel quality information, an MCS is determined, for data transmitted each time, based on a transmission quality target and first channel quality information of the data transmitted each time, resolving a problem that the transmission quality target cannot meet a requirement of the low-delay and high-reliability service and a system efficiency requirement at the same time.

Figure 10:
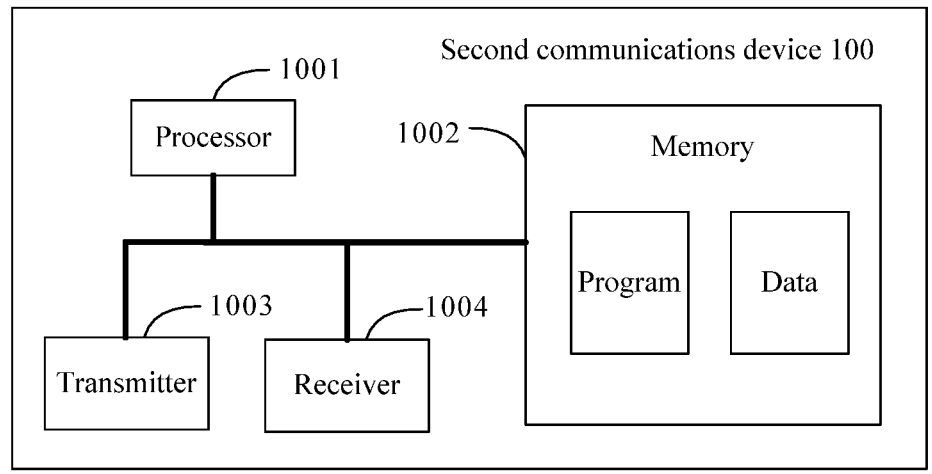
FIG. 10 is a schematic structural diagram of a second communications device according to another embodiment of the present invention.

Based on the data transmission method described in the embodiment corresponding to FIG. 2*a*, FIG. 3*a*, FIG. 4*a*, FIG. 5*a*, or FIG. 6*a*, an embodiment of the present invention provides a second communications device, configured to perform the data transmission method described in the embodiment corresponding to FIG. 2*a*, FIG. 3*a*, FIG. 4*a*, FIG. 5*a*, or FIG. 6*a*. Referring to FIG. 10, the second communications device 100 includes a processor 1001, a memory 1002, a transmitter 1003, and a receiver 1004. The processor 1001, the memory 1002, the transmitter 1003, and the receiver 1004 are connected to each other. The memory 1002 is configured to store data and a program, and the processor 1001 is configured to invoke the program stored in the memory 1002 to perform, by using the transmitter 1003 and the receiver 1004, the data transmission method described in the embodiment corresponding to FIG. 2*a*, FIG. 3*a*, FIG. 4*a*, FIG. 5*a*, or FIG. 6*a*.

The processor 1001 is configured to receive, by using the receiver 1004, a modulation and coding scheme (MCS) that is of to-be-transmitted data and that is sent by a first communications device. The MCS of the to-be-transmitted data is determined by the first communications device based on a first transmission quality target and first channel quality information.

The processor 1001 is further configured to: receive, by using the receiver 1004, the to-be-transmitted data sent by the first communications device, and demodulate and decode the to-be-transmitted data based on the MCS of the to-be-transmitted data.

With reference to the data transmission method described in the embodiment corresponding to FIG. 2*b*, FIG. 3*b*, FIG. 4*b*, FIG. 5*b*, or FIG. 6*b*, the second communications device 100 may be further configured to perform the data transmission method described in the embodiment corresponding to FIG. 2*b*, FIG. 3*b*, FIG. 4*b*, FIG. 5*b*, or FIG. 6*b*.

The processor 1001 is configured to receive, by using the receiver 1004, a modulation and coding scheme (MCS) that is of to-be-transmitted data and that is sent by a first communications device. The MCS of the to-be-transmitted data is determined by the first communications device based on a first transmission quality target and first channel quality information.

The processor 1001 is further configured to: code and modulate the to-be-transmitted data based on the MCS of the to-be-transmitted data, and send the coded and modulated to-be-transmitted data to the first communications device by using the transmitter 1003.

Optionally, the processor 1001 is further configured to: obtain the first transmission quality target, and generate the first channel quality information based on the first transmission quality target.

The processor 1001 is further configured to send the first channel quality information to the first communications device by using the transmitter 1003.

Optionally, the processor 1001 is further configured to determine the first transmission quality target from a plurality of transmission quality targets based on a delay requirement and a reliability requirement of the to-be-transmitted data. A lower delay requirement of the to-be-transmitted data indicates a higher first transmission quality target. A higher reliability requirement of the to-be-transmitted data indicates a higher first transmission quality target. Further, the processor 1001 is configured to send the first transmission quality target to the first communications device by using the transmitter 1003.

Alternatively, optionally, the processor 1001 is further configured to receive, by using the receiver 1004, the first transmission quality target sent by the first communications device.

Optionally, the processor 1001 is further configured to: determine the first transmission quality target from a plurality of transmission quality targets based on a delay requirement and a reliability requirement of the to-be-transmitted data, and send the first transmission quality target to the first communications device by using the transmitter 1003. A lower delay requirement of the to-be-transmitted data indicates a higher first transmission quality target. A higher reliability requirement of the to-be-transmitted data indicates a higher first transmission quality target.

Optionally, the processor 1001 is further configured to: measure a channel based on a second transmission quality target, and generate second channel quality information.

The processor 1001 is further configured to send the second channel quality information to the first communications device by using the transmitter 1003.

Optionally, the MCS of the to-be-transmitted data is determined by the first communications device according to a preset mapping relationship or a preset mapping list and based on the first transmission quality target and the first channel quality information.

Optionally, the transmission quality target includes at least one of a target block error rate (BLER), a target signal-to-noise ratio (SNR), a service type, and a parameter related to a transmission target. For example, the target BLER is 0.1 or 0.00001, the target signal-to-noise ratio (SNR) is 3 dB or 6 dB, or a service is a low-delay and high-reliability service or a common service. With regard to the parameter related to the transmission target, for example, a number of HARQs, the number of HARQs is zero or eight. If the number of HARQs is zero, a corresponding service is a low-delay and high-reliability service. If the number of HARQs is eight, a corresponding service is a common service.

Optionally, the first channel quality information includes at least one of a channel quality indicator (CQI), a precoding matrix indicator (PMI), and a rank indication (RI).

The second communications device provided in this embodiment of the present invention receives the modulation and coding scheme (MCS) that is of the to-be-transmitted data and that is sent by the first communications device; and receives the to-be-transmitted data sent by the first communications device and demodulates and decodes the to-be-transmitted data based on the MCS of the to-be-transmitted data, or codes and modulates the to-be-transmitted data based on the MCS of the to-be-transmitted data and sends the coded and modulated to-be-transmitted data to the first communications device. Because the MCS of the to-be-transmitted data is determined based on the first transmission quality target and the first channel quality information, an MCS is determined, for data transmitted each time, based on a transmission quality target and first channel quality information of the data transmitted each time, resolving a problem that the transmission quality target cannot meet a requirement of the low-delay and high-reliability service and a system efficiency requirement at the same time.

Figure 11:
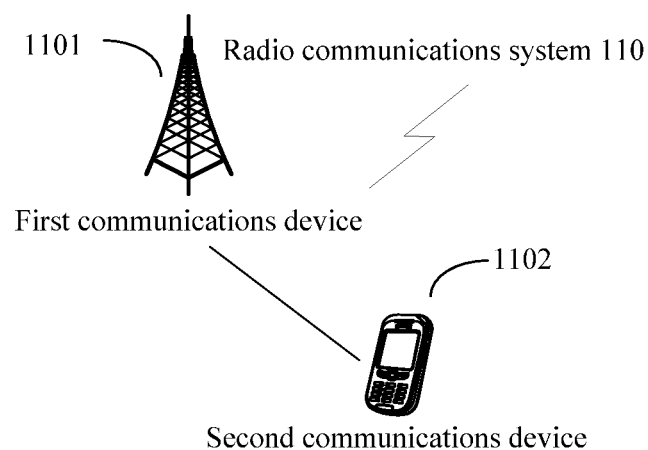
FIG. 11 is a schematic structural diagram of a radio communications system according to an embodiment of the present invention.

Based on the foregoing embodiments corresponding to FIG. 1a to FIG. 10, an embodiment of the present invention provides a radio communications system, configured to perform the data transmission methods described in the embodiments corresponding to FIG. 1a to FIG. 6b. Referring to FIG. 11, the radio communications system 110 includes a first communications device 1101 and a second communications device 1102.

The first communications device is the first communications device described in the embodiment corresponding to FIG. 7, and the second communications device is the second communications device described in the embodiment corresponding to FIG. 8.

Alternatively, the first communications device is the first communications device described in the embodiment corresponding to FIG. 9, and the second communications device is the second communications device described in the embodiment corresponding to FIG. 10.

In the radio communications system provided in this embodiment of the present invention, the first communications device obtains a first transmission quality target and a first channel quality information; determines a modulation and coding scheme (MCS) of to-be-transmitted data based on the first transmission quality target and the first channel quality information; sends the MCS of the to-be-transmitted data to the second communications device; and codes and modulates the to-be-transmitted data based on the MCS of the to-be-transmitted data and sends the coded and modulated to-be-transmitted data to the second communications device, or receives the to-be-transmitted data coded and modulated by the second communications device based on the MCS of the to-be-transmitted data. Because the MCS of the to-be-transmitted data is determined based on the first transmission quality target and the first channel quality information, an MCS is determined, for data transmitted each time, based on a transmission quality target and first channel quality information of the data transmitted each time, resolving a problem that the transmission quality target cannot meet a requirement of a low-delay and high-reliability service and a system efficiency requirement at the same time.

A person of ordinary skill in the art may understand that all or some of the steps of the embodiments may be implemented by hardware or a program instructing related hardware. The program may be stored in a computer-readable storage medium. The storage medium may include a read-only memory, a magnetic disk, an optical disc, or the like.

The foregoing descriptions are merely example embodiments of the present invention, but are not intended to limit the present invention. Any modification, equivalent replacement, and improvement made without departing from the spirit and principle of the present invention shall fall within the protection scope of the present invention.

What is claimed is:
1. A method, comprising:
obtaining, by a first communications device, a target block error rate (BLER), wherein the target BLER is selected from two preset BLERs, and the two preset BLERs are a BLER of 0.1 and a BLER of 0.00001;
obtaining, by the first communications device, first channel quality information, wherein the first channel quality information indicates quality of a channel between the first communications device and a second communications device, and the first channel quality information is obtained based on the target BLER;
determining, by the first communications device, a modulation and coding scheme (MCS) of to-be-transmitted data based on the target BLER and the first channel quality information;

coding and modulating, by the first communications device, the to-be-transmitted data based on the MCS of the to-be-transmitted data, to form coded and modulated to-be-transmitted data; and sending, by the first communications device, the MCS of the to-be-transmitted data and the coded and modulated to-be-transmitted data to the second communications device.

2. The method according to claim 1, wherein obtaining, by the first communications device, the target BLER comprises:

determining, by the first communications device, the target BLER from the two preset BLERs based on a delay requirement and a reliability requirement of the to-be-transmitted data.

3. The method according to claim 2, further comprising:
sending, by the first communications device, the target BLER to the second communications device;
wherein obtaining, by the first communications device, the first channel quality information comprises:
receiving, by the first communications device, the first channel quality information from the second communications device.

4. The method according to claim 1, wherein obtaining, by the first communications device, the first channel quality information comprises:
receiving, by the first communications device, the first channel quality information from the second communications device.

5. The method according to claim 1, wherein the first channel quality information comprises a channel quality indicator (CQI).

6. The method according to claim 1, wherein the target BLER is the BLER of 0.00001.

7. A method, comprising:
receiving, by a second communications device, a modulation and coding scheme (MCS) of data that is sent by a first communications device, wherein the MCS of the data is determined by the first communications device based on a target block error rate (BLER) and first channel quality information, wherein the target BLER is selected from two preset BLERs, and the two preset BLERs are a BLER of 0.1 and a BLER of 0.00001;
receiving, by the second communications device, the data sent by the first communications device; and
demodulating and decoding, by the second communications device, the data based on the MCS of the data.

8. The method according to claim 7, wherein before receiving, by the second communications device, the MCS of the data that is sent by a first communications device, the method further comprises:
obtaining, by the second communications device, the target BLER;
generating, by the second communications device, the first channel quality information based on the target BLER; and
sending, by the second communications device, the first channel quality information to the first communications device.

9. The method according to claim 7, wherein obtaining, by the second communications device, the target BLER comprises:
determining, by the second communications device, the target BLER from based on a delay requirement and a reliability requirement of the data.

10. The method according to claim 7, wherein obtaining, by the second communications device, the target BLER comprises:
receiving, by the second communications device, the target BLER from the first communications device.

11. The method according to claim 7, wherein the MCS of the data is determined by the first communications device according to a preset mapping relationship or a preset mapping list, and the MCS of the data is determined by the first communications device based on the target BLER and the first channel quality information.

12. The method according to claim 7, wherein the first channel quality information comprises a channel quality indicator (CQI).

13. The method according to claim 7, wherein the target BLER is the BLER of 0.00001.

14. A first communications device, comprising:
a processor; and
a non-transitory memory, wherein the memory is configured to store an execution instruction, and the processor is configured to execute the execution instruction to enable the first communications device to:
obtain a target block error rate (BLER), wherein the target BLER is selected from two preset BLERs, and the two preset BLERs are a BLER of 0.1 and a BLER of 0.00001;
obtain first channel quality information, wherein the first channel quality information indicates quality of a channel between the first communications device and a second communications device, and the first channel quality information is obtained based on the target BLER;
determine a modulation and coding scheme (MCS) of to-be-transmitted data based on the target BLER and the first channel quality information;
code and modulate the to-be-transmitted data based on the MCS of the to-be-transmitted data, to form coded and modulated to-be-transmitted data; and
send the MCS of the to-be-transmitted data and the coded and modulated to-be-transmitted data to the second communications device.

15. The first communications device according to claim 14, wherein obtaining the target BLER comprises:
determining the target BLER based on a delay requirement and a reliability requirement of the to-be-transmitted data.

16. The first communications device according to claim 15, wherein the processor is configured to execute the execution instruction to further enable the first communications device to:
send the target BLER to the second communications device; and
wherein obtaining the first channel quality information comprises:
receiving the first channel quality information from the second communications device.

17. The first communications device according to claim 14, wherein the first channel quality information comprises a channel quality indicator (CQI).

18. The first communications device according to claim 14, wherein the target BLER is the BLER of 0.00001.

19. A second communications device, comprising:
a processor; and
a non-transitory memory, wherein the memory is configured to store an execution instruction, and the processor is configured to execute the execution instruction to enable the second communications device to:

receive a modulation and coding scheme (MCS) of data that is sent by a first communications device, wherein the MCS of the data is determined by the first communications device based on a target block error rate (BLER) and first channel quality information, wherein the target BLER is selected from two preset BLERs, and the two preset BLERs are a BLER of 0.1 and a BLER of 0.00001;

receive the data sent by the first communications device; and demodulate and decode the data based on the MCS of the data.

20. The second communications device according to claim 19, wherein the processor is configured to execute the execution instruction to further enable the second communications device to:

before receiving the MCS of the data that is sent by the first communications device, obtain the target BLER;

generate the first channel quality information based on the target BLER; and send the first channel quality information to the first communications device.

21. The second communications device according to claim 20, wherein obtaining the target BLER comprises:

determining the target BLER from the two preset BLERs based on a delay requirement and a reliability requirement of the data.

22. The second communications device according to claim 20, wherein obtaining the target BLER comprises:

receiving the target BLER from the first communications device.

23. The second communications device according to claim 19, wherein the first channel quality information comprises a channel quality indicator (CQI).

24. The second communications device according to claim 19, wherein the target BLER is the BLER of 0.00001.

* * * * *